United States Patent
Park et al.

(10) Patent No.: US 9,197,771 B2
(45) Date of Patent: Nov. 24, 2015

(54) USER TERMINAL APPARATUS AND METHOD OF CONTROLLING THEREOF

(71) Applicant: Samsung Electronics Co., Ltd, Suwon-si, Gyeonggi-do (KR)

(72) Inventors: In-chang Park, Suwon-si (KR); Gi-won Seo, Seoul (KR); Hyung-jong Kang, Seoul (KR); Mi-sook Song, Suwon-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 0 days.

(21) Appl. No.: 14/060,713

(22) Filed: Oct. 23, 2013

(65) Prior Publication Data

US 2014/0111823 A1 Apr. 24, 2014

Related U.S. Application Data

(60) Provisional application No. 61/717,181, filed on Oct. 23, 2012.

(30) Foreign Application Priority Data

Nov. 26, 2012 (KR) .................. 10-2012-0134847

(51) Int. Cl.
*H04N 1/00* (2006.01)
*G06F 3/12* (2006.01)

(52) U.S. Cl.
CPC .......... *H04N 1/00466* (2013.01); *G06F 3/1204* (2013.01); *G06F 3/1229* (2013.01); *G06F 3/1285* (2013.01); *H04N 1/00411* (2013.01); *H04N 1/00474* (2013.01); *H04N 1/00477* (2013.01); *H04N 1/00482* (2013.01)

(58) Field of Classification Search
None
See application file for complete search history.

(56) References Cited

U.S. PATENT DOCUMENTS

2006/0290949 A1* 12/2006 Nogawa ................... 358/1.1
2010/0315686 A1 12/2010 Hong et al.

FOREIGN PATENT DOCUMENTS

EP 2 336 873 A2 6/2011
WO WO 2006/119533 A1 11/2006

OTHER PUBLICATIONS

Steven Sinofsky, Simplifying Printing in Windows 8, Jul. 25, 2015.*
Brian Burgess, How to Print from Windows 8 Metro Apps, Aug. 14, 2012.*

(Continued)

*Primary Examiner* — Hilina K Demeter
(74) *Attorney, Agent, or Firm* — Staas & Halsey LLP

(57) ABSTRACT

A user terminal apparatus to connect to an image forming apparatus and which is driven by an operating system (O/S), and which includes a storage to store a metro application to provide a user interface window including status information of the image forming apparatus and a V4 driver to communicate with the image forming apparatus, a communicating interface to receive a first status message and address information of the image forming apparatus by using the V4 driver, a controller to control the communicating interface to request a second status message that is more detailed than a first status message to the image forming apparatus by using the metro application and the address information, and a display to display at least one of the first status message and the second status message on a user interface window provided by the metro application.

22 Claims, 27 Drawing Sheets

(56) References Cited

OTHER PUBLICATIONS

Brian Burgess, How to Set Up a printer in Windows 8, Aug. 2, 2012.*
Steven Sinofsky, Simplifying Printing in Windows 8, Jul. 25, 2012.*

Extended European Search Report issued on Sep. 5, 2014 in corresponding European Patent Application No. 13189951.0.

* cited by examiner

USER TERMINAL APPARATUS AND METHOD OF CONTROLLING THEREOF

CROSS-REFERENCE TO RELATED APPLICATIONS

This application claims priority under 35 U.S.C. §120 from U.S. Provisional Patent Application No. 61/717,181, filed on Oct. 23, 2012, in the United States Patent and Trademark Office, and under 35 U.S.C. §119(a) from Korean Patent Application No. 10-2012-0134847, filed on Nov. 26, 2012, in the Korean Intellectual Property Office, the disclosures of which are incorporated herein by reference in their entireties.

BACKGROUND

1. Field

The present general inventive concept relates to a user terminal apparatus and a method of controlling thereof, and more specifically, to a user terminal apparatus that can connect to an image forming apparatus, and a method of controlling the user terminal apparatus.

2. Description of the Related Art

An image forming apparatus operates to print out print data generated at a user terminal apparatus, such as a computer, onto a printing material. Examples of the image forming apparatus includes a copying machine, a printer, a scanner, a facsimile, or a multi function peripheral (MFP) implementing as one apparatus a combination of functions of the copy machine, the printer, the scanner, and the facsimile.

The image forming apparatus can perform jobs of printing, scanning, and faxing, according to a control of a user terminal apparatus.

Meanwhile, the user terminal apparatus is driven by an operating system (O/S). O/S is a main part of system software and classes of programs providing an interface so that a user can utilize the user terminal apparatus more easily.

One O/S of a user terminal apparatus, Windows 8™ of Microsoft is a hybrid O/S that supports different types of a plurality of user interfaces (UI) to each other. Windows 8™ supports desktop style UI (or desktop UI) which is basically used from initial Windows to Windows 7™ and new graphic user interface which is metro style UI (or metro UI, Windows 8 Style UI, tile-type UI).

Windows 8™ can access apps and contents more conveniently in a tablet and a smart phone as well as a personal computer by supporting a metro style UI, i.e., a new graphic user interface and providing interface optimized for touch.

However, a metro style UI environment of Windows 8™ may have several limitations in controlling an image forming apparatus, unlike in a conventional desktop UI environment.

Specifically, because bulk channel communication of USB at Windows 8™ is limited, both the desktop style UI environment and the metro style UI environment may not be scanned with a universal serial bus (USB). Further, even if using network, because the metro style environment does not support a standard software interface to use image scanners such as Window Image Acquisition (WIA) and Technology Without Any Interested Name (TWAIN), the metro style UI environment of Windows 8™ does not basically provide a scan function.

Since a metro style UI environment of Windows 8™ does not have attributes to capture an IP address necessary to communicate with an image forming apparatus connected via a network or Application Program Interface (API), a scan function is not basically provided.

Meanwhile, information regarding port names and model names to be used to connect an image forming apparatus to a user terminal apparatus can be obtained with a printer spooler. However, port names may be modified by the user voluntarily, which is difficult to use as it is. Thus, a method of getting IP address of an image forming apparatus is requested.

Further, informing status errors of an image forming apparatus has limitations in a metro style UI environment of Windows 8™. A background program cannot be implemented on Windows 8™, and an informing event of status errors cannot be received. In this case, Windows 8™ creates an event to display a status error via a printer driver. However, Windows 8™ compares each status only with EqualTo, NotEqualTo, GreaterThan, and LessThan, and thus, has limitations in which it cannot provide status information on various conditions, or which cannot provide status information through a conventionally used interface.

Further, in a metro style UI environment of Windows 8™, a user can enter a background screen of an O/S at any time. Thus, if a user implements jobs of an image forming apparatus and exits corresponding application, he cannot a check job processing status of an image forming apparatus on a background screen of the O/S. In addition, if a plurality of image forming apparatuses is connected together, and if many job options should be established, a user feels inconvenience because he needs to implement a corresponding application, select an image forming apparatus to implement job, and establish respective job options.

SUMMARY

The present general inventive concept provides a user terminal apparatus to receive a detailed status message of an image forming apparatus with an operating system (O/S) having limitations in informing statuses of an image forming apparatus, and provides status information regarding errors or warnings of an image forming apparatus to a user, and a control method thereof.

Additional features and utilities of the present general inventive concept will be set forth in part in the description which follows and, in part, will be obvious from the description, or may be learned by practice of the general inventive concept.

The foregoing and/or other features and utilities of the present general inventive concept are achieved by providing a non-transitory computer readable recording medium having embodied thereon a computer program to execute a method of controlling a user terminal apparatus to connect to an image forming apparatus and which is driven by an operating system (O/S) of WINDOWS, wherein the program includes a metro application to provide a user interface window including status information of the image forming apparatus and a V4 driver to communicate with the image forming apparatus, wherein the V4 driver receives a first status message and address information of the image forming apparatus, and the metro application utilizes the address information received via the V4 driver, requests a second status message that is more detailed than the first status message to the image forming apparatus, and displays at least one of the first status message and the second status message on the user interface window.

The metro application may determine whether requesting the second status message is needed based on types of the received first status message.

The metro application may request the second status message only if determining that the second status message is needed.

The metro application utilizes at least one of the first status message and the second status message to connect to a troubleshooting page, if a user manipulation to select user interface window displaying the status message is input.

The first status message may be predefined in the V4 driver.

The first status message may be defined in event XML of the V4 driver.

The second status message may include at least one attribute from among warning, error and info regarding status of the image forming apparatus.

The metro application may request a second status message again after a delay of a predetermined time, if status attributes extracted from the second status message are not warning or error.

If a user sets types of the first status message that necessitate request of the second status message, the metro application determines whether requesting the second status message is needed or not based on the types of the first status message set by the user.

The foregoing and/or other features and utilities of the present general inventive concept may also be achieved by providing a control method of a user terminal apparatus connected to an image forming apparatus and which is driven on an operating system (O/S) of WINDOWS, the control method including receiving a first status message and address information of the image forming apparatus by using V4 driver communicating with the image forming apparatus, requesting a second status message that is more detailed than the first status message to the image forming apparatus by using a metro application previously stored in the user terminal apparatus and the address information, and displaying at least one of the first status message and the second status message on a user interface window provided by the metro.

The control method may further include determining whether requesting the second status message is needed based on types of the received first status message.

The requesting of the second status message may be performed only if determining that the second status message is needed.

The first status message may be predefined in the V4 driver.

The first status message may be defined in event XML of the V4 driver.

The second status message may include at least one attribute from among warning, error and info regarding status of the image forming apparatus.

If status attributes extracted from the second status message are not warning or error, a second status message may be requested again after a delay of a predetermined time.

The determining may include setting, by the user, types of the first status message which necessitate request of the second status message and determining whether requesting the second status message is needed based on the types of the first status message set by the user.

The foregoing and/or other features and utilities of the present general inventive concept may also be achieved by providing a user terminal apparatus which can connect to an image forming apparatus and which is driven on an operating system (O/S) of WINDOWS, including a storage to store a metro application to provide a user interface window including status information of the image forming apparatus and a V4 driver communicating with the image forming apparatus, a communicating interface to receive a first status message and address information of the image forming apparatus by using the V4 driver, a controller to control the communicating interface to request a second status message that is more detailed than a first status message to the image forming apparatus by using the metro application and the address information, and a display to display at least one of the first status message and the second status message on a user interface window provided by the metro application.

The foregoing and/or other features and utilities of the present general inventive concept may also be achieved by providing a method of controlling a user terminal apparatus, including receiving a first status message and address information of an image forming apparatus using a printer driver, determining whether requesting a second status message is required based on a type of the received first status message, displaying at least one of the first and second status messages in a pop-up format based on the determination and a metro application, and connecting a troubleshooting page by using at least one of the first and second status messages based on a user's selection thereof.

The method may further include requesting the second status message if it is determined that the second status message is required.

Only the first status message may be displayed in a pop-up format if it is determined that the second status message is not required.

The first status message may be a message predefined by the printer driver, and defined in an event XML of the printer driver.

The method may further include managing the image forming apparatus installed in the UTA and controlling transmission of image forming jobs of the image forming apparatus using a printer spooler.

At least one of the printer driver and the printer spooler may provide a status informing event to a metro application based on at least one of the first and second status message received from an image forming apparatus by being connected to an event XML of the printer driver.

BRIEF DESCRIPTION OF THE DRAWINGS

These and/or other features and utilities of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
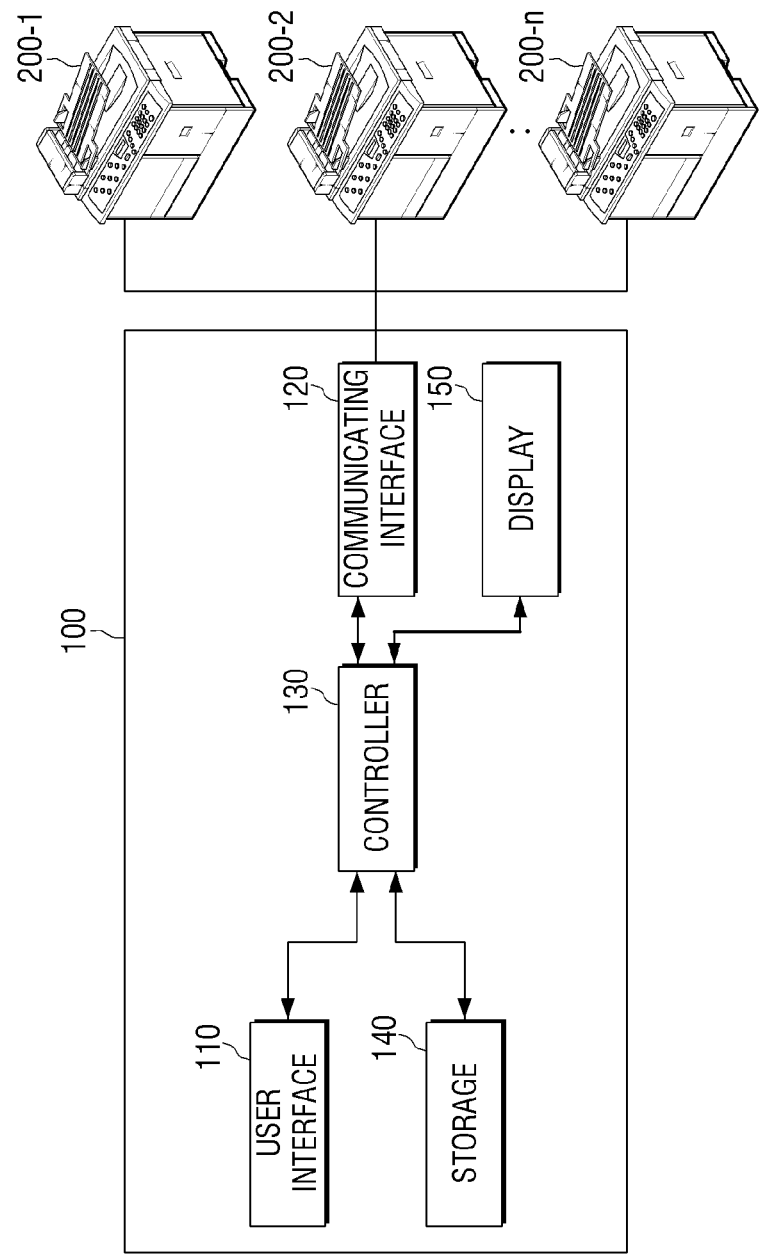
FIG. 1 is a block diagram of a user terminal apparatus according to an exemplary embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

FIG. 1 illustrates a user terminal apparatus 100 according to an exemplary embodiment of the present general inventive concept.

Referring to FIG. 1, the user terminal apparatus 100 may include a user interface 110, a communicating interface 120, a controller 130, a storage 140, and a display 150. The user terminal apparatus 100 may connect at least one of image forming apparatuses 200-1, 200-2, . . . , 200-n through the communicating interface 120.

Although a plurality of the image forming apparatuses 200-1, 200-2, . . . , 200-n may connect to the user terminal apparatus 100, the following description will include only one image forming apparatus 200 for ease of description.

The user interface 110 is installed with a plurality of function keys that a user can establish or select various functions supported by the user terminal apparatus 100, and displays various information provided from the user terminal apparatus 100.

The user interface 110 may be implemented by combining a monitor and a mouse, or may be an apparatus simultaneously operating input and output such as a touch screen. In this case, the user interface 110 may be configured by layering a touch detector (not illustrated) and a display (not illustrated). A touch detector may be implemented as touch sensor perceiving user touch and near-distance sensor perceiving approaching of user touch within near distance, and a display may be implemented as LCD panel which can display various screens such as a background screen including a plurality of icons, a web browsing screen, an application implementing screen, a screen playing various contents such as videos and photographs, and a user interface screen.

The communicating interface 120 communicates with the at least one image forming apparatus 200. Specifically, communication may be performed by contacting with a Universal Serial Bus (USB) port as well as a Local Area Network (LAN) and Internet network. The communicating interface 120 may transmit controlling signals to the at least one image forming apparatus 200 and receive data thereof.

The controller 130 controls various components of the user terminal apparatus 100. Specifically, the controller 130 recalls signals or data input from a Read-Only Memory (ROM) storing a controlling program in order to control a central processing unit (CPU) and the user terminal apparatus 100, recalls signals or data input from external apparatuses of the user terminal apparatus 100, and includes a Random Access Memory (RAM) used as a recall area corresponding to operations performed in the user terminal apparatus 100. The CPU may include at least one of a single core processor, a dual core processor, a triple core processor and a quad core processor. The CPU, ROM, and RAM may connect to each other through internal bus.

The storage 140 stores a metro application to perform jobs with the image forming apparatus 200 and a version 4 (V4) driver to communicate with the image forming apparatus 200.

Meanwhile, the storage 140 may be implemented as a storing medium within the user terminal apparatus 100 and external storing medium, e.g., a removable disk including a USB memory or a web server through a network. This specification describes that the RAM and the ROM used in storing and operating controlling programs are components the controller 130, but they may be implemented as components of the storage 140.

The term, "storage," may include the storage 140, the ROM, the RAM, or a memory card (e.g., a secure digital (SD)

card or memory stick) that is attachable/detachable to/from the user terminal apparatus 100. Further, the storage 140 may include a non-volatile memory, a volatile memory, a hard disk drive (HDD), or a solid state drive (SSD), but is not limited thereto.

The display 150 may display various screens such as a background screen having various tiles, a web browsing screen, an application implementing screen, a screen playing various contents such as videos or photographs, and a user interface screen according to a control of the controller 130.

Meanwhile, although the exemplary embodiment of the present general inventive concept describes that the display 150 and the user interface 110 are separate component, these may be configured as a single component. In this case, the display 150 may be implemented as a touch screen that senses a user touch. Specifically, the display may be configured by layering a touch detector (not illustrated) and a display (not illustrated). A touch detector may be implemented as touch sensor perceiving user touch and a near distance sensor to sense an approaching user touch, and a display may be implemented as a liquid crystal diode (LCD) panel.

The user terminal apparatus 100 having the above components will be described according to each exemplary embodiment of the present general inventive concept below.

First Exemplary Embodiment of the Present General Inventive Concept

Hereinafter, the user terminal apparatus 100 according to the first exemplary embodiment of the present general inventive concept will be explained. Windows 8™ supports a metro style UI environment, and a scan function of an image forming apparatus 200 may not be supported in metro style UI environment. Further, address information of the image forming apparatus 200 may not be provided directly to application. Thus, the user terminal apparatus 100 according to the first exemplary embodiment of the present general inventive concept may use a predefined printer driver, acquire address information of the image forming apparatus 200, and perform a scan function by using gotten address information.

The user interface 110 according to the first exemplary embodiment of the present general inventive concept may receive command to perform a scan job of the image forming apparatus 200 by using a user interface window provided from the metro application if the metro application operates.

The user interface 110 according to the first exemplary embodiment of the present general inventive concept may receive command to perform scan job of the image forming apparatus 200.

Further, the user interface 110 may display an image forming apparatus 200 supporting a predefined printer driver determined by a control of the controller 130, and may select an image forming apparatus 200 to perform a command to perform a scan job. The predefined printer driver may be a V4 driver.

The predefined printer driver indicates a program to control a printer by using a predefined Bidi communication schema. Because the printer driver has different control methods according to apparatus type, a separate printer driver should be installed.

For example, Windows 8™ supports a V4 version of a printer driver, and the printer driver may obtain an IP address and status information of the printer through Bidi communication. Bidi communication schema in EXtensible Markup Language (XML) format may be defined and used to obtain the IP address and the status information of the printer.

Predefined Bidi communication schema will be explained in detail by referring to FIG. 3.

The communicating interface 120 uses the V4 driver, requests address information of an image forming apparatus 200, and receives address information of the requested image forming apparatus 200. Specifically, the communicating interface 120 may request and receive network address information corresponding to the image forming apparatus 200 supporting the V4 driver.

Further, the communicating interface 120 may use the V4 driver, request address information of the image forming apparatus 200 selected by the user interface 130 of the image forming apparatus 200, and receive address information from the image forming apparatus 200.

Meanwhile, the communicating interface 120 may use the V4 driver, request and receive status information of the image forming apparatus 200 as well as address information of the image forming apparatus 200.

Status information may include at least one of network information, supportable job information, and component consumption information regarding the image forming apparatus 200. Specifically, the network information indicates information regarding a network connecting status of an image forming apparatus 200, network security status, and network address (i.e., a port address or an IP address). Supportable job information indicates information regarding whether jobs such as print, scan, copy, or fax are supported, and whether options in each job are supported.

Meanwhile, status information includes capability information, provides troubleshooting guide based on capability information, and provides functions of ordering consumables or linking web page of manufacturers. Further, status information may display notification of errors while printing, may provide troubleshooting guide to a user during selecting, or may be used in establishing high quality print options such as eco, job accounting, and confidential expression setting.

Meanwhile, address information indicates a network address of an image forming apparatus 200, i.e., the IP address. Because the network address of an image forming apparatus 200 cannot be obtained in the O/S of this embodiment, the network address may be transmitted from the image forming apparatus 200 by using a predefined printer driver.

Although it is described that address information of an image forming apparatus 200 has separate meaning from status information, address information of the image forming apparatus 200 may be included in status information of the image forming apparatus 200.

Bidi communication schema used during requesting and receiving address information and status information of an image forming apparatus 200 will be further explained by referring to FIG. 3 below.

Meanwhile, the communicating interface 120 may receive scan data corresponding to command to perform scan job from the image forming apparatus 200.

The controller 130 controls the communicating interface 120 to transmit a command to perform a scan job to an image forming apparatus 200 based on address information of the image forming apparatus 200 and to receive scan data corresponding to command to perform a scan job. Specifically, the controller 130 may control the communicating interface 120 to transmit the command to perform the scan job by using communication protocol different from the predefined printer driver.

The controller 130 may not use the predefined printer driver after obtaining address information of an image forming apparatus 200, directly connect the image forming apparatus 200 based on the address information of the image forming apparatus 200, and control the communicating interface 120 to trans-receive a command to perform a scan job and scan data. Specifically, the controller 130 controls transmission of the command to perform the scan job by utilizing another network module different from the predefined printer driver.

Another network module different from the predefined printer driver is module directly communicating an image forming apparatus 200 by using protocol such as a Simple Network Management Protocol (SNMP) or Hyper Transfer Protocol (HTTP), and can be directly controlled via a metro style application.

Meanwhile, if command to perform scan job is input to the user interface 110, the controller 130 may determine whether an image forming apparatus 200 supports the predefined printer driver, and display the image forming apparatus 200 supporting the predefined printer driver.

Further, the controller 130 may transmit scan options selected in the user interface 110 with a command to perform a scan job to the image forming apparatus.

Scan options are setting values to perform the scan job, e.g., values setting whether both sides are scanned, whether color scan is performed, resolution, brightness, and image size, but are not limited thereto. In this specification, scan options may be set based on status address of an image forming apparatus 200, in other words, a supportable job information.

The storage 140 stores metro application displaying a user interface window to receive commands to perform a scan job and a V4 driver communicating with an image forming apparatus.

Meanwhile, the storage 140 may store a list of the image forming apparatuses 200 connected the user terminal apparatus 100. A list of the image forming apparatuses 200 may include respective port names or model names of the image forming apparatuses 200.

Further, the storage 140 may map address information and status information of an image forming apparatus 200 transmitted from the image forming apparatus 200 with a list of the image forming apparatuses 200, and store mapped information. After mapping and storing, the storage 140 may store scan data transmitted from the image forming apparatus 200.

The display 150 may display a user interface window so as to receive a selection of scan options based on status information of the image forming apparatus 200 received from the communicating interface 120. Further, the display 150 may display a list of image forming apparatuses supporting predefined printer driver according to determining of the controller 130.

Meanwhile, the communicating interface 120 may display scan data corresponding to a command to perform a scan job received from the communicating interface 120.

The user terminal apparatus 100 according to the first exemplary embodiment of the present general inventive concept as described above may obtain address information of the image forming apparatus 200 connected to the user terminal apparatus 100 in the O/S that does not directly provide address information of the image forming apparatus 200, and can provide application performing the scan job by using the address information.

Second Exemplary Embodiment of the Present General Inventive Concept

Hereinafter, a user terminal apparatus 100 according to second exemplary embodiment of the present general inventive concept will be described. The metro style UI environment of Windows 8™ has limitations in informing status errors of an image forming apparatus 200. Specifically, error status may be informed of a user only during a performing of print job of an image forming apparatus 200, and types of error status have 128 limitations provided in O/S. Thus, about 500 error statuses provided from conventional image forming apparatuses cannot be delivered fully.

Thus, the user terminal apparatus 100 according to the second exemplary embodiment of the present general inventive concept is installed to provide informing status errors that cannot be used conventionally due to the above limitations without changing firmware of an image forming apparatus 200.

The user interface 110 may receive user manipulation to select the user interface window displaying status message provided from the metro application. Further, user manipulation to set types of a first status message requesting a second status message may be input.

Hereinafter, a first status message and a second status message will be explained in detail with reference to a description of the communicating interface 120.

The communicating interface 120 may utilize a printer driver of an image forming apparatus 200, and receive a first status message and address information of an image forming apparatus 200. The printer driver may be a V4 driver.

Further, the communicating interface 120 may utilize address information of an image forming apparatus 200 according to a control of the controller 130, request a second status message to the connected image forming apparatus 200, and receive a second status message. Specifically, after obtaining the address information of an image forming apparatus 200 by control of the controller 130, the communicating interface 120 may connect the image forming apparatus 200 based on address information of the image forming apparatus 200 without utilizing the printer driver. In this case, the communicating interface 120 may communicate with an image forming apparatus 200 by using another network module different from the printer driver.

In this second exemplary embodiment of the present general inventive concept, a first status message of an image forming apparatus 200 is predefined message in printer driver. Specifically, a first status message indicates a message defined in event XML of printer driver. For example, metro UI environment of Windows 8™ supports V4 version of printer driver and the printer driver may load predefined event XML. Thus, because status message defined in loaded event XML is only received, further detailed status of an image forming apparatus 200 may not be checked.

Meanwhile, a first status message according to the second exemplary embodiment of the present general inventive concept may include 13 status messages redefined in the V4 printer driver; DoorOpen, MarkerSupplyLow, MarkerFailure, MarkerSupplyEmpty, MediaLow, MediaEmpty, MediaJam, MediaNeeded, OutputAreaAlmostFull, OutputAreaFull, AttentionRequired, Paused, End of job or job cancel are among messages classified as errors of 128 status messages supported by the O/S in the metro UI environment of Windows 8™.

Figure 8:
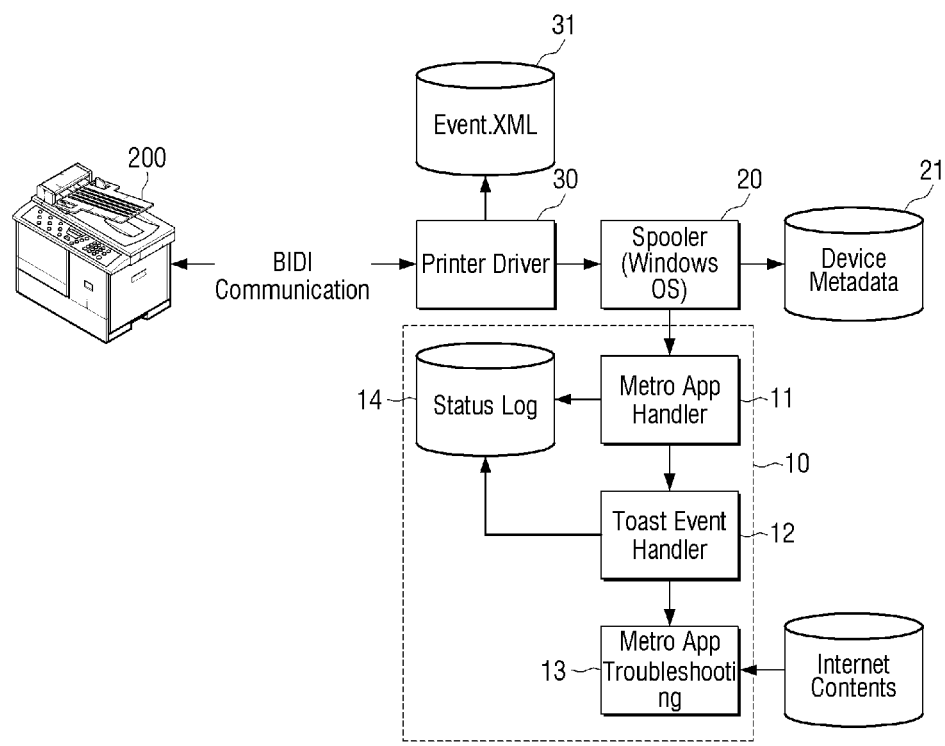
FIG. 8 illustrates a process of informing statuses in a metro style user interface environment of Windows 8™.

Additional explanations of a first status message will follow by referring to FIG. 8.

Meanwhile, a second status message indicates message delivering a more detailed status of an image forming apparatus 200 than a first status message and having comparing attributes that are not defined in the printer driver. Because a second status message can provide more types of status information compared to a first status message, further detailed status of an image forming apparatus 200 can be informed of the user terminal apparatus 100.

Figure 9:
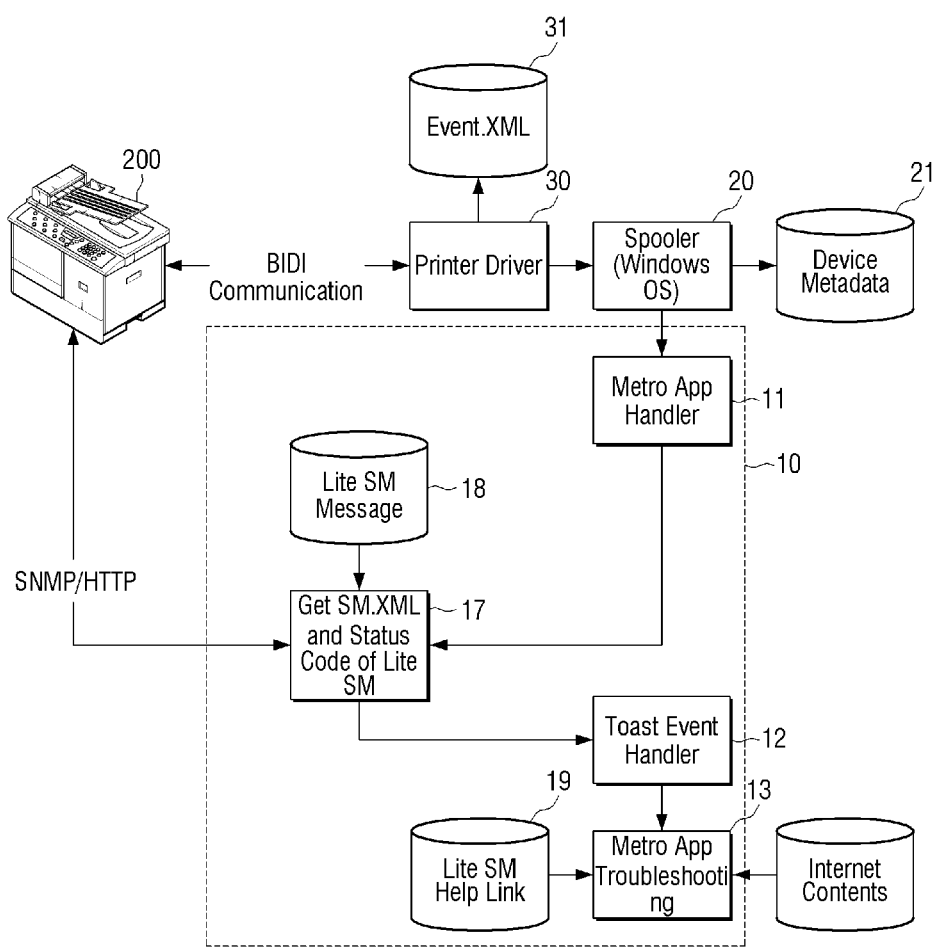
FIG. 9 illustrates an operation of informing status on a user terminal apparatus according to second exemplary embodiment of the present general inventive concept.

Additional explanation of a second status message will follow by referring to FIG. 9.

Address information of an image forming apparatus 200 indicates a network address of an image forming apparatus 200, i.e., an IP address, as described in first exemplary embodiment of the present general inventive concept. Because network address of an image forming apparatus 200 cannot be obtained in the O/S of this second exemplary embodiment of the present general inventive concept, the network address may be transmitted from an image forming apparatus 200 by using the printer driver.

The controller 130 may utilize address information of an image forming apparatus 200, and request a second status message more detailed than a first status message to the image forming apparatus 200. Specifically, the controller 130 may not use printer driver after obtaining address information of the image forming apparatus 200, and directly control the communicating interface 120 to connect the image forming apparatus 200 based on the address information of the image forming apparatus 200.

Meanwhile, based on types of the received first status message, the controller 130 may determine whether requesting a second status message is needed. Specifically, according to types of the first status message predefined in printer driver, the controller 130 may determine whether requesting a second status message having further detailed information is needed.

For example, if in "DoorOpen" status, comparing conditions included in a first status message are enough to provide information to a user. However, if in "PaperEmpty" status, comparing conditions included in a first status message are insufficient to provide information regarding which paper feeder among at least one paper feeders is short of paper materials. Thus, a second status message more detailed than a first status message may be determined to be needed. As a result, if in "DoorOpen" status, a second status message may be determined to not be needed. However, if in "PaperEmpty" status, a second status message may be determined to be needed.

Like the above example, a second status message may be requested to an image forming apparatus 200 only if the controller 130 determines to need a second status message. Determining process will be explained below by referring to FIG. 10.

Meanwhile, if inputting user manipulation to set types of a first status message where a second status message will be further requested, the controller 130 may determine whether requesting a second status message is needed based on types of a first status message. Specifically, the user terminal apparatus 100 may receive established types of a first status message where a second status message will be requested directly from a user. Thus, based on types of a first status message set by the user, the controller 130 may determine a request of a second status message. Further explanation will follow by referring to FIG. 12.

Meanwhile, if status attributes extracted from a second status message are not warning or error, the controller 130 may request a second status message again after a delay of a predetermined time.

For example, unlike in a first status message, a second status message may include various information regarding a status of an image forming apparatus 200. Specifically, a second status message may include at least one attribute of warning, error and info regarding status of an image forming apparatus 200. In this case, if status attributes extracted from a second status message are not warning or error, the controller 130 may receive a second status message again after a delay of a predetermined time. The reason to implement such an operation is that receiving time points of a first status message and a second status message are different from each other. Thus, by considering updating time of status in an image forming apparatus 200, a second status message may be received after a delay of a predetermined time if there is error/warning. If a second status message refers to error/warning, information may be displayed in a pop-up format based on the second status message, and the information process may complete if a second status message refers to info.

Meanwhile, if a user selects a pop up displayed on the display 150, the controller 130 may use at least one of a first status message and a second status message and connect to troubleshooting page. Specifically, if not receiving a second status message, a troubleshooting page may be connected by using a first status message. If receiving a second status message, the troubleshooting page may be connected by using both of the first and the second status messages. Specific explanation of connecting the troubleshooting page will follow by referring to FIGS. 9 and 10.

The storage 140 may store the predefined first status message. Further, the storage 140 may store types of a first status message where a second status message will be requested.

The display 150 displays at least one of first and second status messages. Specifically, if not receiving a second status message, status of an image forming apparatus 200 that should be informed of a user is extracted from a first status message, and the pop up of the interface window displays information. If receiving a second status message, status of an image forming apparatus 200 that should be informed of a user may be extracted based on first and second status messages and information may be displayed on user interface window utilizing the metro application in the pop-up format.

Meanwhile, a method of displaying informing by the display 150 may use the pop-up format or other various types of informing display.

The user terminal apparatus 100 according to second exemplary embodiment of the present general inventive concept as described above may receive detailed status message of an image forming apparatus 200 in the O/S having limitations in informing status of the image forming apparatus 200, and provide status information regarding errors or warnings of the image forming apparatus 200 to a user.

Third Exemplary Embodiment of the Present General Inventive Concept

Hereinafter, a user terminal apparatus 100 according to third exemplary embodiment of the present general inventive concept will be explained. In a metro style UI environment of Windows 8™ unlike a conventional desktop UI environment, a plurality of secondary tiles in direct format may be created for one application.

A tile is rectangle or square shape of icon used in a background screen in the metro style UI environment of Windows 8™, and has a kind of link function moving to application, website, address book, and other items. Unlike conventional icons, a tile may display changes of information regarding each connected items in real time, and for example, display a number of unread messages in a received email mailbox in real time. The tile may be classified into two types, namely an application tile (main tile) and a secondary tile. The application tile (main tile) indicates a tile created when installing applications, and the secondary tile indicates a tile additionally created by the user. Tile will be further explained by referring to FIG. 15.

A user can use a previously created secondary tile and enter a specific page of corresponding application at any time, and a processing status of the corresponding application can be displayed on the tile at any time.

The user terminal apparatus 100 according to the third exemplary embodiment of the present general inventive concept to be described below may use the secondary tile, and perform jobs of an image forming apparatus 200. Therefore, a solution is provided to the problem that a job processing status of an image forming apparatus cannot be checked on a background screen of the O/S if exiting a corresponding application screen, and to an inconvenience that an image forming apparatus to perform jobs should be selected and each of the job options should be set if a plurality of image forming apparatuses are connected and if too many job option settings are provided.

The user interface 110 receives a selection of job options applied to an image forming apparatus 200 through a user interface window provided by metro applications.

In this case, the user interface 110 may receive a selection of an image forming apparatus 200 to perform jobs as well as selection of job options.

Figure 20:
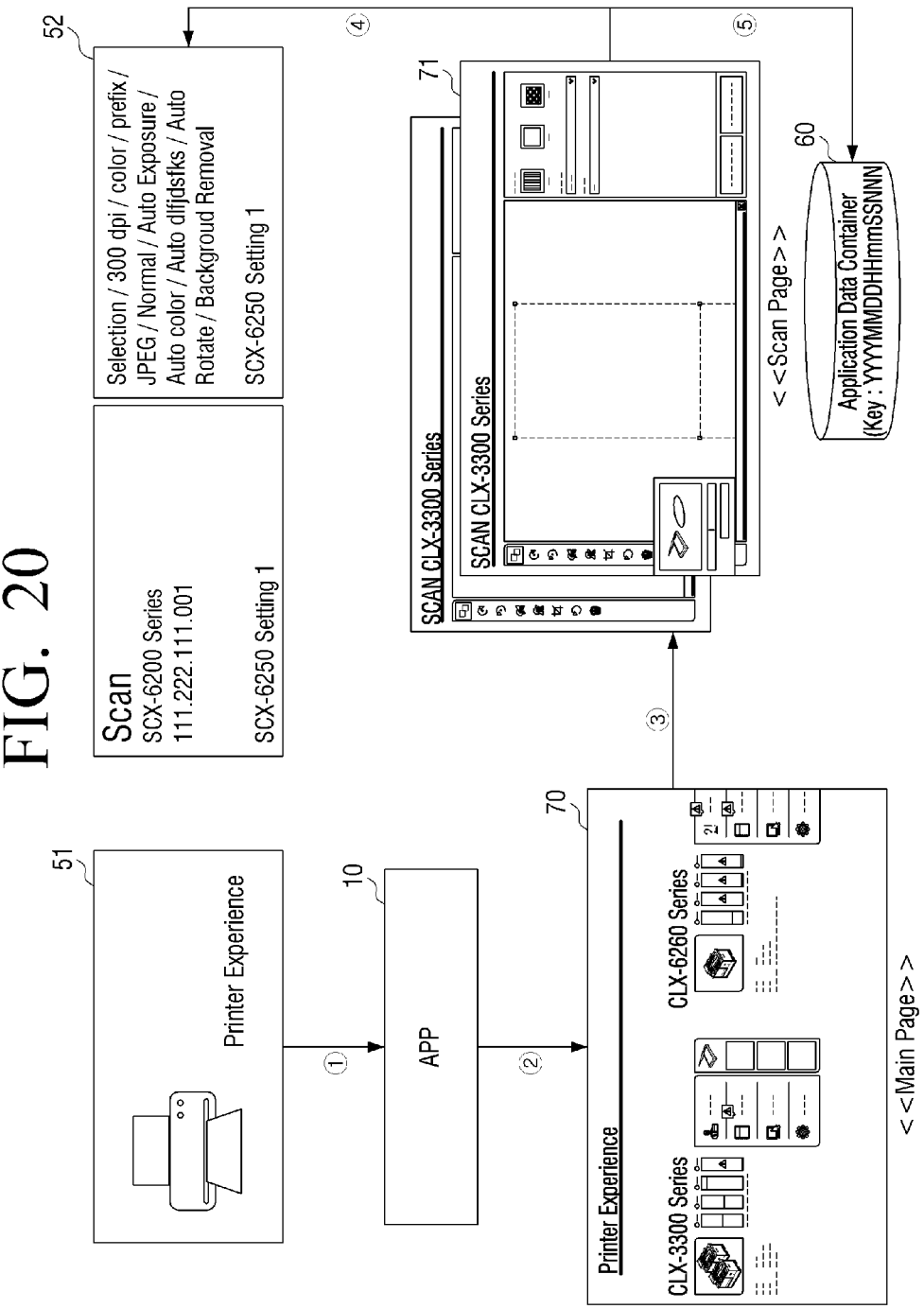
FIG. 20 is illustrates an operation of creating secondary tile of a user terminal apparatus according to third exemplary embodiment of the present general inventive concept.

Further explanation will follow by referring to FIG. 20.

The communicating interface 120 uses the metro application and transmits a command to perform a job to an image forming apparatus 200 based on job options corresponding to a UI area. Specifically, if the UI area corresponding to job options is selected, the controller 130 implements a metro application to perform jobs with an image forming apparatus 200, and automatically applies job options corresponding to the UI area. The communicating interface 120 may transmit command to perform the job to an image forming apparatus 200 based on the applied job options.

UI area indicates area displaying at least one of job options and device information of the image forming apparatus 200 to perform and jobs. UI area may be configured in a tile shape format. This may be a secondary tile in a metro style UI environment of Windows 8™. The third exemplary embodiment of the present general inventive concept describes that the UI area is created in the tile shape format, but the UI area shape may change.

Meanwhile, if inputting a user manipulation to modify job options on job perform page, the communicating interface 120 may transmit a command to perform a job to an image forming apparatus 200 based on the modified job options. Specifically, if a UI area corresponding to job options is selected, the display 150 may display a job perform page of the application such that job options corresponding to UI area are automatically applied. If job options are modified on the displayed job perform page, the communicating interface 120 may transmit command to perform the job to an image forming apparatus 200 based on the modified job options.

The controller 130 controls creating a UI area corresponding to a selection of job options, and displaying created UI area on a background screen. The created UI area corresponding to job options may be a secondary tile as described above. Further explanation will follow by referring to FIG. 20.

Meanwhile, if finding previously created UI area regarding an image forming apparatus 200, the controller 130 may control updating job options corresponding to a previously created UI area to job options selected in the user interface 110, displaying the updated job options on background screen, and storing the updated job options in the storage 140. Specifically, if a secondary tile corresponding to the image forming apparatus 200 selected by the user is already created on applications, a new secondary tile may be created or a previous secondary tile may be newly updated according to a user selection. Further explanation will follow by referring to FIG. 22.

Meanwhile, if a predefined UI area is selected on a background screen, the controller 130 may implement an application to perform jobs. The predefined UI area includes a main tile so as to implement application performing jobs of an image forming apparatus, which may be provided basically when installing applications. This will be further described by referring to FIG. 20.

Meanwhile, if a UI area corresponding to job options is selected, the controller 130 may implement metro application to perform jobs with an image forming apparatus. The UI area corresponding to job options may be a secondary tile described above.

Meanwhile, the controller 130 may control mapping the job options with the UI area and storing the mapped information.

Meanwhile, while jobs are performed in an image forming apparatus 200 according to commands to perform the jobs, the controller 130 may display job performance information of the image forming apparatus 200 on the UI area. Specifically, the controller 130 may display a job processing status of the image forming apparatus 200 on the secondary tile corresponding to the image forming apparatus 200. This will be further explained by referring to FIG. 24.

Meanwhile, if the jobs are completed in an image forming apparatus 200 according to the command to perform the jobs, the controller 130 may display job performance results of the image forming apparatus 200 on UI area. Specifically, the controller 130 may display job performance results of an image forming apparatus 200 on the secondary tile corresponding to the image forming apparatus 200. This will be further explained by referring to FIG. 24.

The storage 140 may map selected job options with a corresponding UI area and store the mapped results. Specifically, the storage 140 may map job options selected by the user with the created UI area, i.e., with the secondary tile and the store mapped information. Further, in addition to job options, the storage 140 may also map information of an image forming apparatus to perform jobs with the created UI area, i.e., with the secondary tile, and store mapped data. For example, the storage 140 may map and store device information and job option setting information of an image forming apparatus 200 with the tile ID using created time information as a key. By referring to FIG. 15, this will be further described.

The display 150 displays a background screen having a UI area corresponding to job options. Specifically, the display 150 may display the background screen of an O/S having a UI area corresponding to job options, i.e., a secondary tile.

Meanwhile, if the UI area corresponding to the job options is selected, the display 150 may display a job performance page of application that job options corresponding to the UI area are automatically applied.

The user terminal apparatus 100 according to the third exemplary embodiment of the present general inventive concept described above may provide a UI area where an image forming apparatus 200 to perform jobs and job options are automatically applied, and thus, can perform jobs without redundant processing. Further, a job processing status may be displayed on the UI area, and the user intuitionally notices the job processing information in real time basis.

Hereinafter, programs implemented in the user terminal apparatus 100 will be explained by referring to FIG. 2. Explanations may be commonly applied to the aforementioned first, second and third exemplary embodiments of the present general inventive concept.

Figure 2:
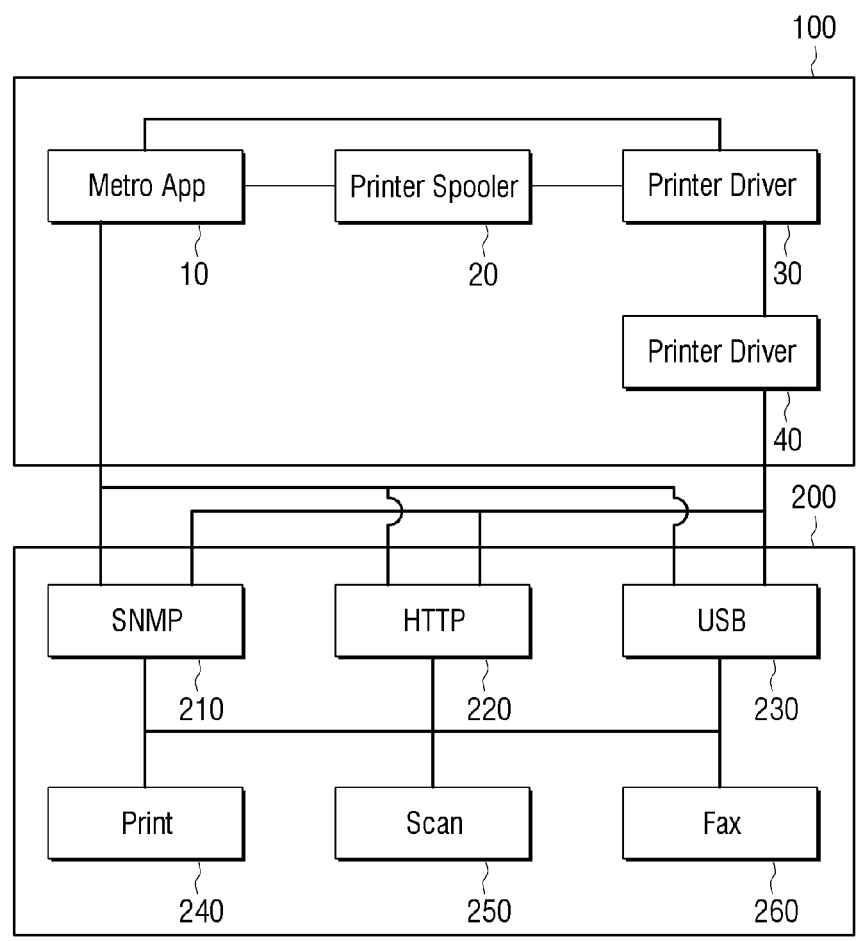
FIG. 2 is a brief block diagram of programs implemented in a user terminal apparatus according to an exemplary embodiment of the present general inventive concept.

FIG. 2 is a brief block diagram of programs implementing in the user terminal apparatus 100 according to an exemplary embodiment of the present general inventive concept.

By referring to FIG. 2, in order to control an image forming apparatus 200, programs such as a metro app 10, a printer spooler 20, a printer driver 30, and a port monitor 40 may be implemented in the user terminal apparatus 100.

The metro app 10 is an application implementing a metro style UI environment of Windows 8™ and performing various job functions of an image forming apparatus 200. It may support start experience, advanced print setting experience, and print notification experience defined by Microsoft™.

Further, the metro app 10 may directly communicate with the image forming apparatus 200 by utilizing another network module without using the printer driver 30. Communication protocols used in this case may include SNMP, HTTP, and USB.

Meanwhile, the metro app 10 may be a windows store app or metro application. If installing the printer driver 30 of the image forming apparatus 200, the metro app 10 may be automatically installed in the user terminal apparatus 100. Further, the metro app 10 provides additional information by interlocking with the image forming apparatus 200, and provides additional troubleshooting guide, order for consumables, and a manufacturer website link regarding errors during printing to enhance user convenience.

The printer spooler 20 manages an image forming apparatus 200 installed in the user terminal apparatus 100 and controls transmitting image forming jobs of the image forming apparatus 200.

The printer driver 30 is program to control an image forming apparatus 200 in the user terminal apparatus 100, and performs function of converting commands delivered from applied programs to the image forming apparatus 200 into commands suitable for the image forming apparatus 200 during printing.

The present exemplary embodiment supports V4 version of printer driver in the metro UI environment of Windows 8™, and the printer driver 30 may obtain the IP address and status information of the printer through Bidi communication. Bidi communication schema in XML format can be defined and used to obtain the IP address and the status information of printer.

Meanwhile, the printer driver 30 may be V4 driver in the metro UI environment of Windows 8™.

The port monitor 40 is network interface supported by the metro UI environment of Windows 8™, and supports protocols such as TCP/IP, USB, and WSD, but is not limited thereto. However, the port monitor 40 has several limitations. For example, a control channel may not be supported regarding USB, and types of status messages regarding an image forming apparatus 200 have design limitations.

Although FIG. 2 describes that the port monitor 40 is a separate program from the printer driver 30, the port monitor 40 may be established and included in the printer driver 30.

Meanwhile, an image forming apparatus 200 may have communicating interface such as SNMP 210, HTTP 220, and USB 230, and perform jobs such as print 240, scan 250, and fax 260.

FIGS. 3 through 7 describe the user terminal apparatus 100 according to the first exemplary embodiment of the present general inventive concept.

Figure 3:
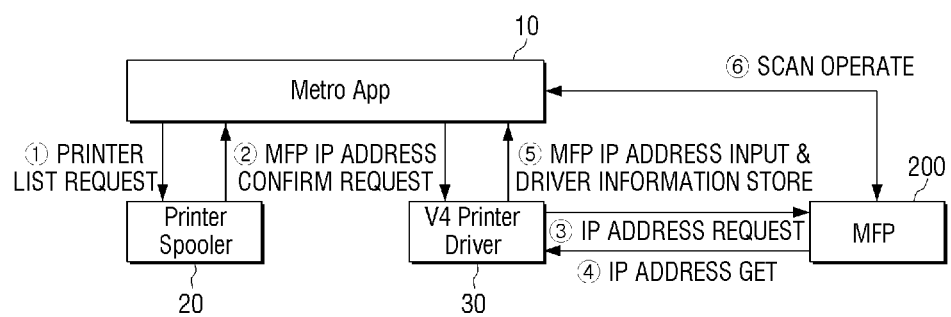
FIG. 3 illustrates operation to obtain address information of an image forming apparatus connected to a user terminal apparatus according to a first exemplary embodiment of the present general inventive concept.
Figure 4:
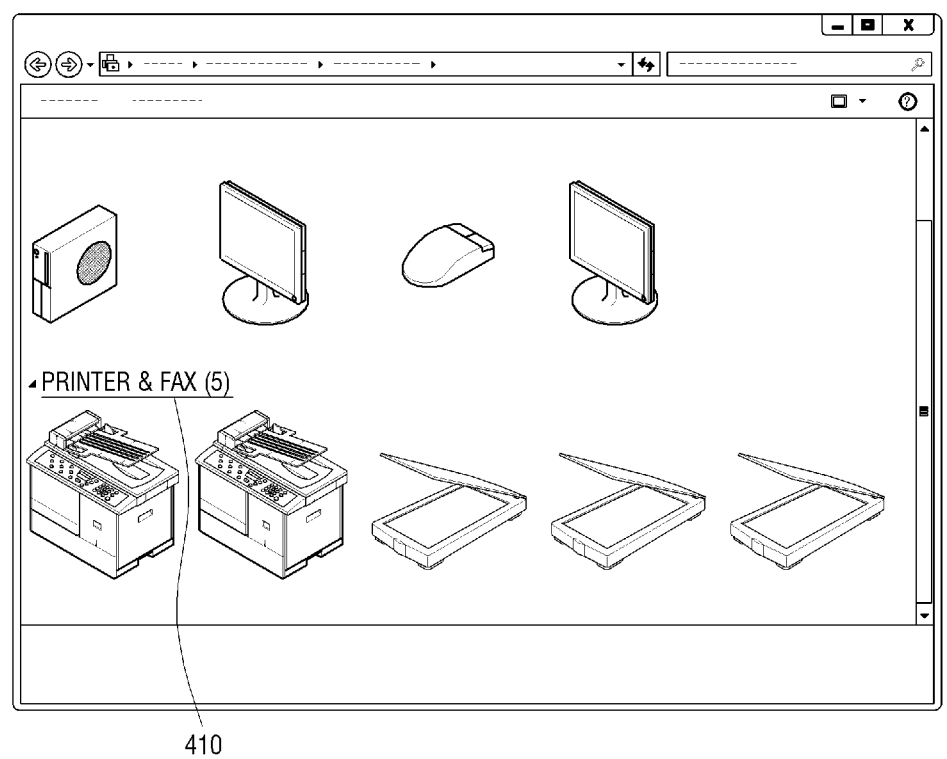
FIG. 4 illustrates a list of image forming apparatuses provided from a printer spooler according to a first exemplary embodiment of the present general inventive concept.

FIG. 3 is illustrates operation of obtaining address information of an image forming apparatus 200 connected to the user terminal apparatus 100 according to the first exemplary embodiment of the present general inventive concept.

By referring to FIG. 3, the metro app 10 may receive a list of an image forming apparatus 200 connected to the user terminal apparatus 100 through printer spooler 20. In this case, the metro app 10 may display a list of image forming apparatuses in FIG. 4.

The metro app 10 requests confirming address information of an image forming apparatus 200 to V4 printer driver 30 by using predefined Bidi communication schema like in Table 1 below.

TABLE 1

```
<bidi:Getxmlns:bidi="http://schemas.microsoft.com/windows/2005/03/printing/bidi">
    <Query schema='\Printer.Samsung.IPAddress:IPv4List'/>
</bidi:Get>
```

The V4 printer driver 30 may obtain and store address information of an image forming apparatus 200 in the Bidi communication schema of the predefined Bidi XML format, as illustrated in Table 2 below in response to Bidi communication schema requested from metro app 10.

TABLE 2

```
<?xml version="1.0"?>
<bidi:Schema xmlns:bidi="http://schemas.microsoft.com/windows/2005/03/printing/bidi">
    <Property name="Printer">
        <Property name ="Samsung">
            <Property name="IPAddress">
                <Value name="IPv4List" oid="1.3.6.1.4.1.236.11.5.1.12.2.5" deviceIndex="false" type="BIDI_STRING" drvPrinterEvent="true" refreshInterval="600" />
            </Property>
        </Property>
    </Property>
</bidi:Schema>
```

The V4 printer driver 30 may deliver address information of an image forming apparatus 200 to the metro app 10 according to Bidi communication schema predefined, as illustrated in Table 3 below. Address information of the image forming apparatus 200 includes 10.88.190.85, 192.168.1.5, and 192.168.11.4.

TABLE 3

```
<bidi:Getxmlns:bidi="http://schemas.microsoft.com/windows/2005/03/printing/bidi">
    <Query schema="\Printer.Samsung.IPAddress:IPv4List">
        <Schema name="\Printer.Samsung.IPAddress:IPv4List">
```

TABLE 3-continued

```
        <BIDI_STRING>10.88.190.85,192.168.1.5,192.168.11.4</BIDI_STRING>
    </Schema>
  </Query>
</bidi:Get>
```

The metro app 10 may map status information and address information of an image forming apparatus 200, as illustrated in Table 4 below, and store mapped data in a storage.

TABLE 4

| Field name | Description |
|---|---|
| ID | Device ID |
| Name | |
| PrinterPortName | Port name of Printer |
| IsV4Driver | Whether to find Customized v4 |
| IsBidiSupported | Driver which can get IP Address |
| IPAddress | IP Address |
| ... (and so on) ... | ... (and so on) ... |

If a user drives the metro app 10 and performs the scan function, the metro app 10 may directly transmit a command to perform a scan job to an image forming apparatus 200 without going through the V4 printer driver 30 by using another network module with address information of an image forming apparatus 200 stored in a storage, which is explained above, and obtain scan data. Another network module indicates a module directly communicating with an image forming apparatus 200 by using protocols such as SNMP and HTTP.

Meanwhile, if a predefined V4 printer driver 30 is not installed in the user terminal apparatus 100 or if the above Bidi communication schema is not supported, address information and status information may not be obtained.

Figure 5:
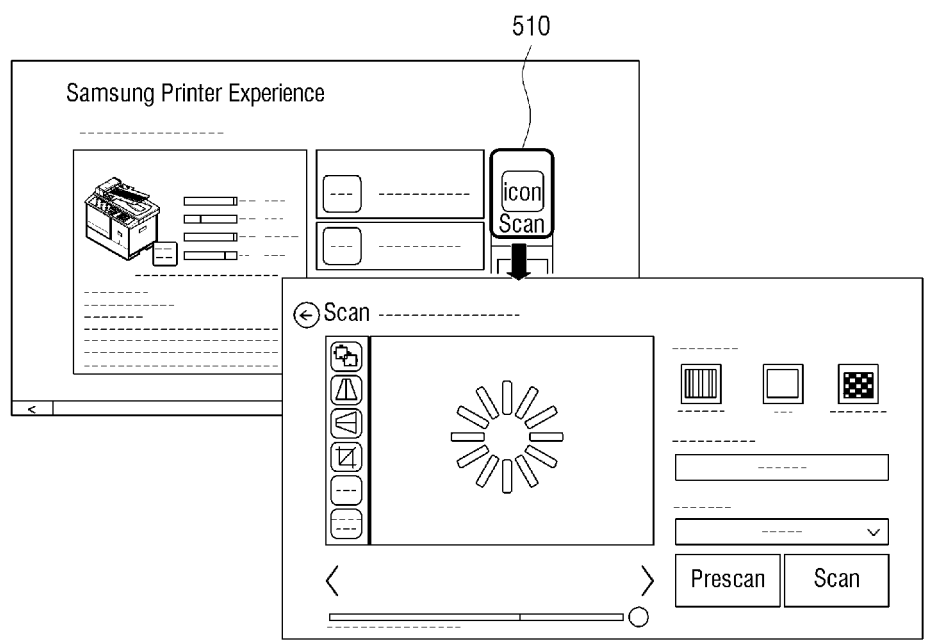
FIG. 5 illustrates operation of performing scan jobs on a user terminal apparatus according to a first exemplary embodiment of the present general inventive concept.

Otherwise, if supporting V4 printer driver 30 and the above predefined Bidi communication schema, metro app 10 may be displayed as a list of devices supporting a scan function, as illustrated in FIG. 5, and scan function 510 may be activated.

The user terminal apparatus 100 according to the first exemplary embodiment of the present general inventive concept described in FIG. 3 may obtain address information of an image forming apparatus 200 connected to an O/S that does not provide address information of the image forming apparatus 200 directly, and provide the address information to the application performing the scan job.

Figure 6:
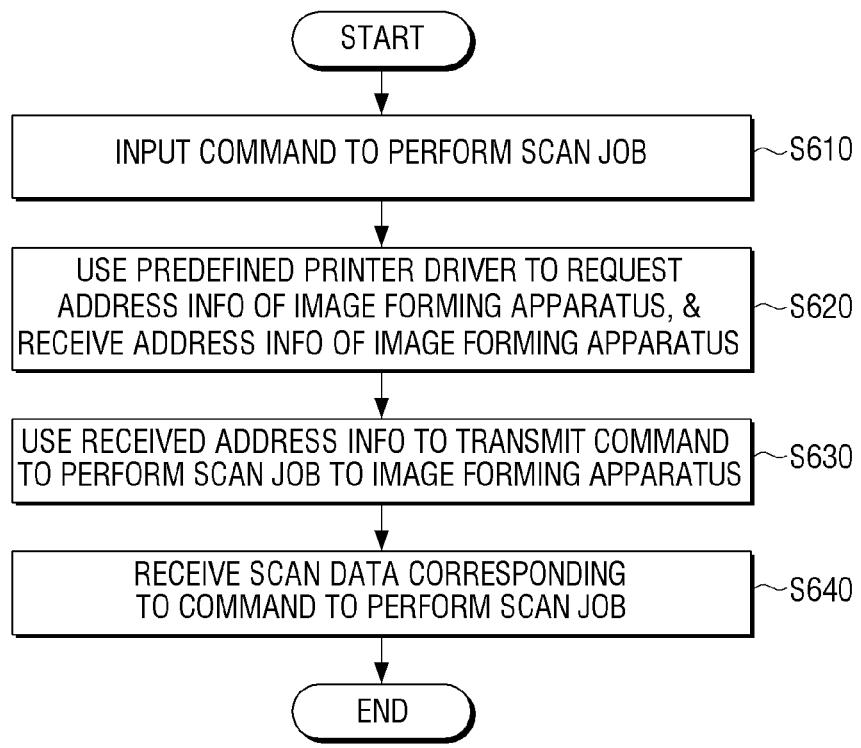
FIG. 6 is a flowchart illustrating a method of controlling a user terminal apparatus according to a first exemplary embodiment of the present general inventive concept.

FIG. 6 is a flowchart illustrating a control method according to the first exemplary embodiment of the present general inventive concept.

By referring to FIG. 6, if a command to perform a scan job of an image forming apparatus 200 is input at S610, the user terminal apparatus 100 requests address information of an image forming apparatus 200 by utilizing a predefined printer driver and receives address information of an image forming apparatus 200 at S620.

The predefined printer driver may be printer driver supporting a predefined Bidi communication schema.

As well as address information of an image forming apparatus 200, status information of the image forming apparatus 200 may be requested and received. Status information may include at least one of network information, supportable job information, and component consumption information regarding an image forming apparatus 200, but is not limited thereto.

Based on the received address information, a command to perform a scan job is transmitted to an image forming apparatus 200 at S630.

The user terminal apparatus 100 may utilize another network module different from the predefined printer driver and transmit the command to perform the scan job. Another network module is already explained by referring to FIG. 1 above, which will not be described within an overlapping scope.

Meanwhile, based on the received status information of the image forming apparatus 200, the user interface window to receive selection of scan options may be displayed. Further, selection of scan options may be transmitted to the image forming apparatus 200 with command to perform scan job.

At S640, scan data corresponding to command to perform scan job is received from the image forming apparatus 200.

The user terminal apparatus 100 may be driven in Windows 8™.

Meanwhile, the method controlling a user terminal apparatus of FIG. 6 may be implemented in the user terminal apparatus 100 having units of FIG. 1, or other units.

Figure 7:
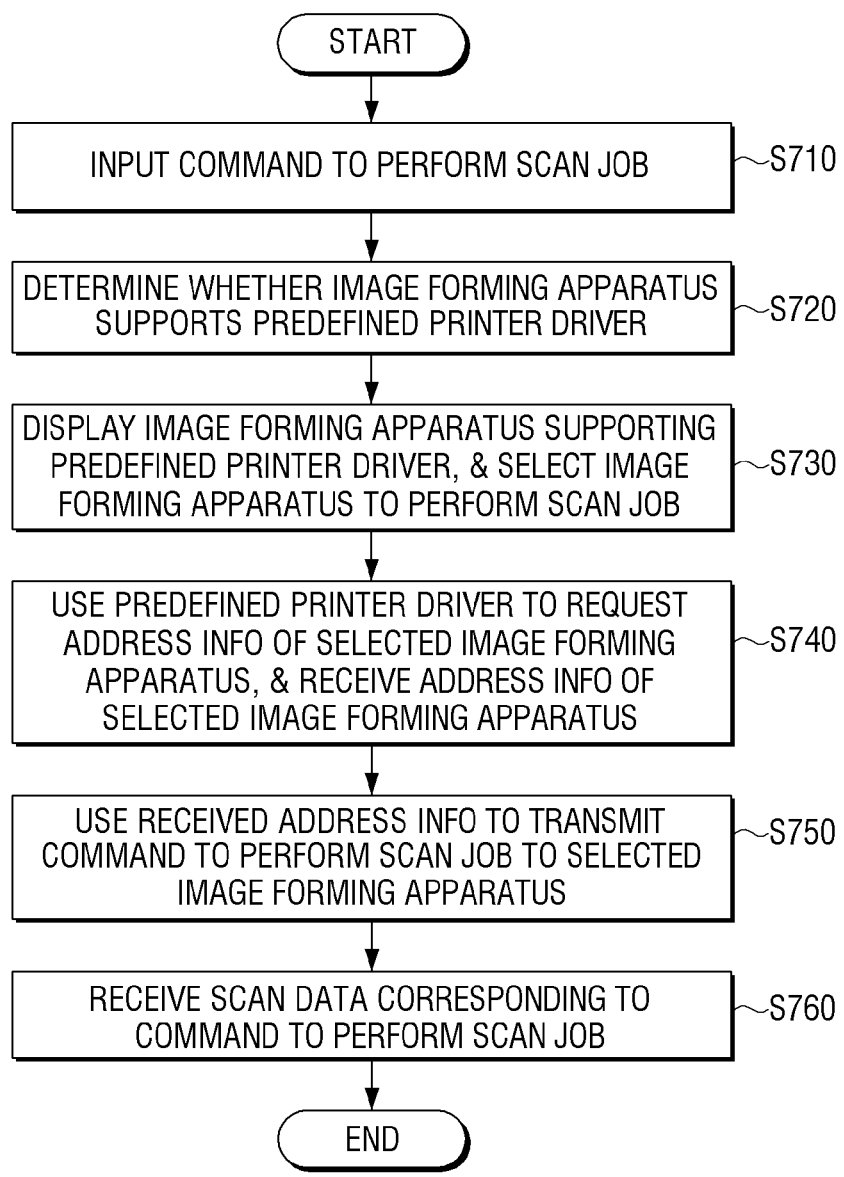
FIG. 7 is a flowchart illustrating a method of controlling a user terminal apparatus according to a first exemplary embodiment of the present general inventive concept.

FIG. 7 is a flowchart illustrating a control method according to the first exemplary embodiment of the present general inventive concept.

By referring to FIG. 7, if command to perform scan job of an image forming apparatus 200 is received at S710, the user terminal apparatus 100 determines whether the image forming apparatus 200 supports the predefined printer driver at S720.

As a determination results, an image forming apparatus 200 supporting the predefined printer driver is displayed and an image forming apparatus 200 to perform the command to perform the scan job is selected at S730.

By utilizing the predefined printer driver, address information of the selection of image forming apparatus 200 is requested and address information of the selection of image forming apparatus 200 is received at S740.

Predefined printer driver may be printer driver to support predefined Bidi communication schema.

As well as address information of the image forming apparatus 200, status information of the image forming apparatus 200 may be requested and received. Status information may include at least one of network information, supportable job information and component consumption information regarding an image forming apparatus 200, but is not limited thereto.

At S750, based on the received address information, a command to perform a scan job of the selection of image forming apparatus 200 is transmitted.

Meanwhile, based on the received status information of the image forming apparatus 200, a user interface window to receive a selection of scan options may be displayed, and the selection of scan options may be transmitted to the image forming apparatus 200 with the command to perform the scan job.

At S760, scan data corresponding to command to perform scan job is received from the image forming apparatus 200.

The user terminal apparatus 100 may be driven in Windows 8™.

Meanwhile, the method of controlling a user terminal apparatus in FIG. 7 may be implemented in the user terminal apparatus 100 having units of FIG. 1 or other units.

The method of controlling the user terminal apparatus 100 according to the first exemplary embodiment of the present general inventive concept may obtain address information of an image forming apparatus 200 connected to an O/S that does not directly provide address information of the image forming apparatus 200, and provide the address information to an application performing the scan job.

In the following, by referring to FIGS. 8 through 14, the user terminal apparatus 100 according to the second exemplary embodiment of the present general inventive concept will be explained.

FIG. 8 illustrates status informing process basically provided in a metro style UI environment of Windows 8™.

By referring to FIG. 8, programs implemented in the user terminal apparatus of FIG. 2 are further divided.

The printer driver 30 may provide a status informing event based on status information received from an image forming apparatus 200 by connecting data of event XML 31. In other words, the structure may only provide status notification of an image forming apparatus 200 provided by the printer driver 30. For example, the value, "2202," is processed as "DoorOpen" in the event XML 31, as illustrated in Table 5 below.

To process status, the event XML 31 of the printer driver 30 can compare "EqualTo," "NotEqualTo," "GreaterThan," and "LessThan" only. Thus, if status cannot be processed with the above four conditions, for instance, a toner value, status information may not be provided to a user.

The spooler 20 indicates printer spooler of FIG. 2, receives status informing event of the printer driver 30, and provide the event to the metro app 10. The spooler 20 is connected to the device metadata 21 and can manage an entire process of an image forming apparatus 200.

The metro app 10 may analyze the status informing event delivered from the spooler 20, display status informing to a user, and perform operation of connecting to a troubleshooting page. Specifically, general operations of the metro app 10 may be controlled by the metro app handler 11, and an operation of displaying status information may be controlled by a toast event handler 12. Controlling operations of the metro app handler 11 and the toast event handler 12 may be recorded by a status log 14. The metro app troubleshooting 13 may control connecting the troubleshooting page by utilizing Internet contents.

Understood in the above descriptions, the process of FIG. 8 provides status informing to a user in metro style UI environment of Windows 8™, but because only the status message previously stored in the event XML 31 files connected to

TABLE 5

```
<?xml version="1.0" encoding="utf-8" ?>
- <de:DriverEvents
xmlns:de="http://schemas.microsoft.com/windows/2011/08/printing/driverevents"
schemaVersion="4.0">
- <DriverEvent eventId="{2D39BF93-0838-4DA9-8E28-E18041E49E14}">
    <Transport>WSD</Transport>
    <Transport>SNMP</Transport>
    <Query>\Printer.Status</Query>
- <Trigger result="\Printer.Status.Summary:StateReason" comparison="EqualTo"
value="DoorOpen">
    <StandardMessage resourceId="2202" />
    </Trigger>
- <Trigger result="\Printer.Status.Summary:StateReason" comparison="EqualTo"
value="MarkerFailure">
    <StandardMessage resourceId="2505" />
    </Trigger>
- <Trigger result="\Printer.Status.Summary:StateReason" comparison="EqualTo"
value="MarkerSupplyEmpty">
    <StandardMessage resourceId="1805" />
    </Trigger>
- <Trigger result="\Printer.Status.Summary:StateReason" comparison="EqualTo"
value="MediaEmpty">
    <StandardMessage resourceId="1501" />
    </Trigger>
- <Trigger result="\Printer.Status.Summary:StateReason" comparison="EqualTo"
value="MediaJam">
    <StandardMessage resourceId="1402" />
    </Trigger>
- <Trigger result="\Printer.Status.Summary:StateReason" comparison="EqualTo"
value="MediaNeeded">
    <StandardMessage resourceId="1701" />
    </Trigger>
- <Trigger result="\Printer.Status.Summary:StateReason" comparison="EqualTo"
value="OutputAreaFull">
    <StandardMessage resourceId="1601" />
    </Trigger>
- <Trigger result="\Printer.Status.Summary:StateReason" comparison="EqualTo"
value="AttentionRequired">
    <StandardMessage resourceId="1007" />
    </Trigger>
- <Trigger result="\Printer.Status.Summary:StateReason" comparison="EqualTo"
value="Paused">
    <StandardMessage resourceId="2600" />
    </Trigger>
    </DriverEvent>
    </de:DriverEvents>
``` printer driver 30 is processed, it has limitations that various conditions of statuses may not be informed to a user.

Hereinafter, status informing of the user terminal apparatus 100 to overcome the above limitations will be explained.

FIG. 9 is illustrates a status informing operation of the user terminal apparatus 100 according to the second exemplary embodiment of the present general inventive concept.

By referring to FIG. 9, a printer driver 30 and a spooler 20 may provide a status informing event to a metro app 10 based on status message received from an image forming apparatus 200 by being connected to an event XML 31, as described in FIG. 8.

In this case, the status message received from the printer driver 30 may be a first status message of FIG. 1.

If status informing event occurs, the metro app 10 obtains address information of the image forming apparatus 200 transmitting a status message from printer driver 30 according to a control of a metro app handler 11.

A communicating module 17 of the metro app 10 may use obtained address information, and request detailed status message in stored XML format 18. The communicating module 17 may directly communicate with an image forming apparatus 200 by utilizing protocols such as SNMP and HTTP, and detailed status message may be a second status message of FIG. 1. Table 6 below illustrates an implementing example of detailed status message. The detailed status message in the XML format 18 may provide English string, status code, or troubleshooting key (general MSG) regarding each status. Status code may be analyzed as "attributes of status" explained in FIG. 1.

TABLE 6

```
- <Status>
- <Ready GeneralMSG="Ready" STRING="Ready">
    <Mask>[00][FF][FF][00][00][00][00][00]</Mask>
    <Status>[81][01][01][FF][FF][FF][FF][FF]</Status>
  </Ready>
- <Printing GeneralMSG="Printing" STRING="Printing...">
    <Mask>[00][FF][FF][00][00][00][00][00]</Mask>
    <Status>[81][01][04][FF][FF][FF][FF][FF]</Status>
  </Printing>
- <Warmingup GeneralMSG="Waiting" STRING="Warming up... Please wait few minutes.">
    <Mask>[00][FF][FF][00][00][00][00][00]</Mask>
    <Status>[83][01][05][FF][FF][FF][FF][FF]</Status>
  </Warmingup>
- <Processing GeneralMSG="Waiting" STRING="Processing">
    <Mask>[00][FF][FF][00][00][00][00][00]</Mask>
    <Status>[81][01][0B][FF][FF][FF][FF][FF]</Status>
  </Processing>
- <PowerSave GeneralMSG="PowerSave" STRING="Sleeping...">
    <Mask>[00][FF][FF][00][00][00][00][00]</Mask>
    <Status>[81][01][03][FF][FF][FF][FF][FF]</Status>
  </PowerSave>
```

Metro app 10 may receive the detailed status message like the above example, and perform operation of displaying status informing by toast event handler 12.

If connecting troubleshooting page is input by the user, metro app troubleshooting 13 may utilize model name and status code of an image forming apparatus 200 extracted from detailed status message, obtain troubleshooting page information from data of lite sm help link 19, and provide the information to a user. Specifically, troubleshooting page information of lite SM help link 19 provide link of a problem and problem solution information with XML information, as illustrated in Table 7 below.

TABLE 7

```
<TroubleshootingList modelname="Samsung SCX-483x 5x3x Series"
indexfile="start_here.htm">
    <Troubleshooting name="Offline"
    target="advanced/offline.htm" />
    <Troubleshooting name="PaperEmpty"
    target="basic/media_and_tray.htm#tray" />
    <Troubleshooting name="PaperLow"
    target="basic/media_and_tray.htm#tray" />
    <Troubleshooting name="PaperMP"
    target="basic/media_and_tray.htm#mp" />
    <Troubleshooting name="JamMP"
    target="basic/jam.htm#jammp" />
    <Troubleshooting name="JamTray1"
    target="basic/jam.htm#jamtray1" />
    <Troubleshooting name="JamTrayN"
    target="basic/jam.htm#jamtray2" />
    <Troubleshooting name="JamInside"
    target="basic/jam.htm#jaminside" />
    <Troubleshooting name="JamExitArea"
    target="basic/jam.htm#jamexitarea" />
    <Troubleshooting name="Jam0Duplex"
    target="basic/jam.htm#jamduplex" />
...
    <Troubleshooting name="MarkerSupplyEmpty"
    target="basic/replacetoner.htm"
DriverStatus="True" ResourceID="1805" />
    <Troubleshooting name="MediaEmpty"
    target="basic/media_and_tray.htm"
DriverStatus="True" ResourceID="1501" />
    <Troubleshooting name="MediaJam" target="basic/jam.htm"
    DriverStatus="True"
ResourceID="1402" />
    <Troubleshooting name="MediaNeeded"
    target="basic/media_and_tray.htm"
DriverStatus="True" ResourceID="1701" />
    <Troubleshooting name="OutputAreaFull"
    target="basic/media_and_tray.htm"
DriverStatus="True" ResourceID="1601" />
    <Troubleshooting name="AttentionRequired"
    target="basic/troubleshooting.htm"
DriverStatus="True" ResourceID="1007" />
    <Troubleshooting name="Paused"
    target="basic/troubleshooting.htm"
DriverStatus="True" ResourceID="2600" />
    <Troubleshooting name="Default"
    target="basic/troubleshooting.htm" />
</TroubleshootingList>
```

Figure 10:
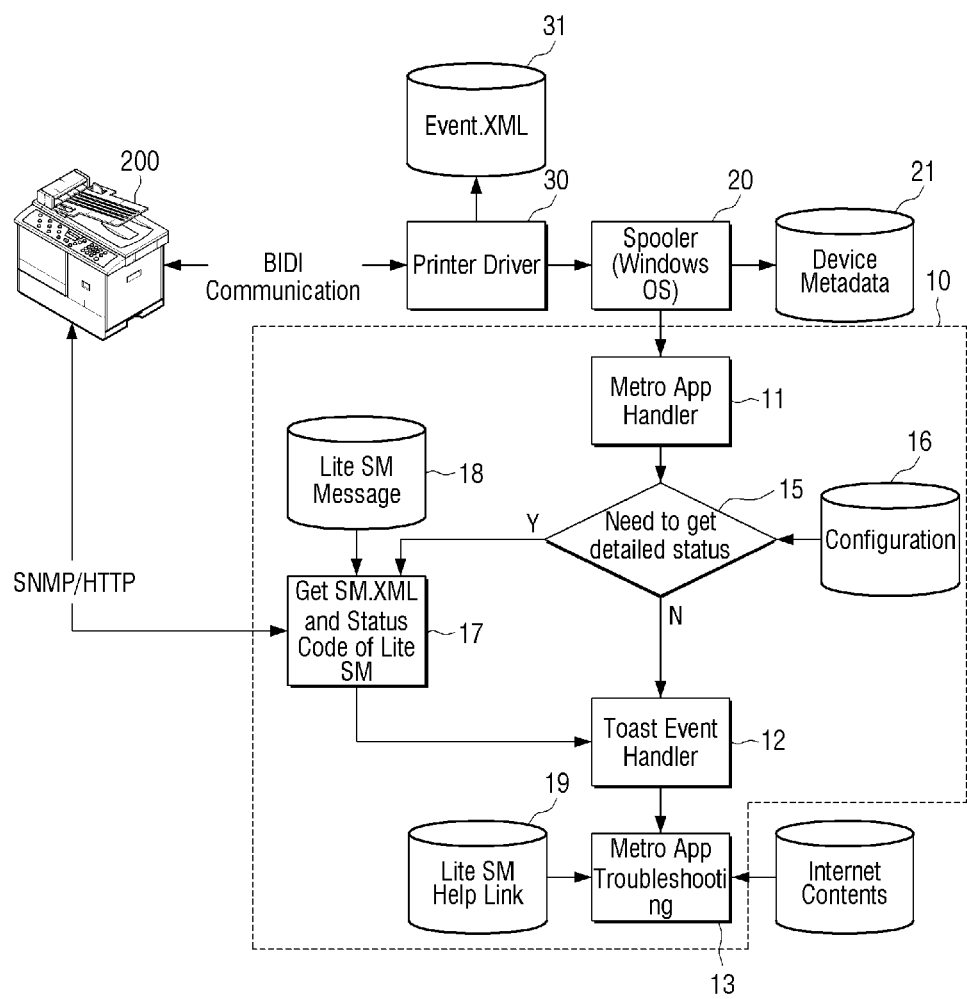
FIG. 10 illustrates an operation of informing status on a user terminal apparatus according to second exemplary embodiment of the present general inventive concept.

FIG. 10 illustrates a status informing operation of the user terminal apparatus 100 according to the second exemplary embodiment of the present general inventive concept, further including a determiner 15 of the metro app 10.

By referring to FIG. 10, the determiner 15 of the metro app 10 may determine whether requesting the detailed status message, i.e., requesting a second status message, is needed. Specifically, according to types of the status messages delivered from the printer driver 30, the determiner 15 may determine whether a detailed status message is needed. For example, if the image forming apparatus 200 is in a "DoorOpen" state, the status information and may be provided as "DoorOpen," without requesting another detailed status message. However, if the image forming apparatus 200 is in a "PaperEmpty" state, a detailed status message may be needed to see which paper feeder is reporting the status.

Types of status messages that need a detailed status message may be stored in a configuration 16 and may be provided during a determination operation. Table 8 below is an example of the configuration 16. In the below example, because GetDetailedStatus is in a "No" state if the image forming apparatus 200 is in an offline state, a detailed status message is not needed. In contrast, if the GetDetailedStatus is in a "Yes" state and along with the "PaperEmpty" state, a detailed status message is requested.

TABLE 8

```
<StatusConfiguration modelname="Samsung SCX-483x 5x3x Series">
    <Status DriverEvent="Offline" GetDetailedStatus="No" />
    <Status DriverEvent="PaperEmpty" GetDetailedStatus="Yes" />
    ...
</StatusConfiguration>
```

Meanwhile, the configuration 16 may be defined by manufacturers of the metro app 10 or a user.

The above determiner 15 of the metro app 10 may request detailed status messages again regarding all status messages delivered from the printer driver 30, as illustrated in FIG. 8, in order to mitigate consumption of system resources and network resources.

Figure 11:
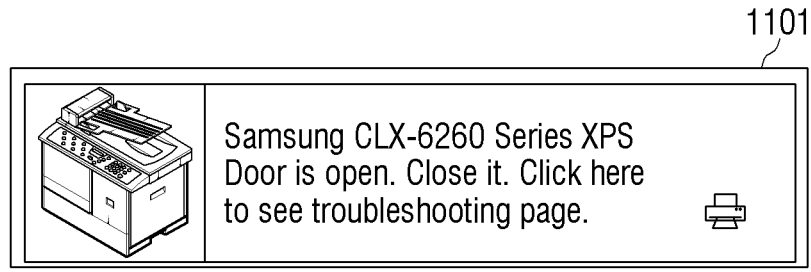
FIG. 11 illustrates a pop-up display according to second exemplary embodiment of the present general inventive concept.

FIG. 11 illustrates displaying a pop-up format according to the second exemplary embodiment of the present general inventive concept.

By referring to FIG. 11, based on status message of an image forming apparatus 200, interface window 1101 may be created and displayed in a pop-up format on part of a background screen in an O/S. If a user manipulation to select interface window 1101 is input, the user terminal apparatus 100 may create and display a troubleshooting page.

Figure 12:
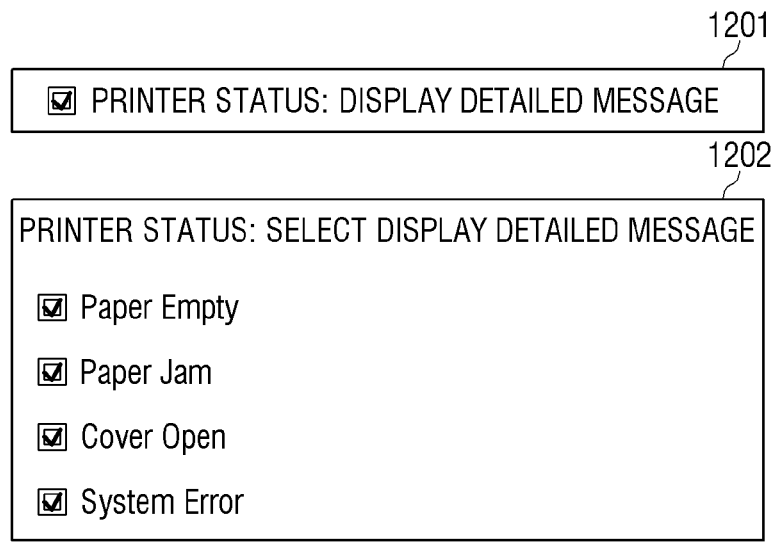
FIG. 12 illustrates a user establishing an operation according to second exemplary embodiment of the present general inventive concept.

FIG. 12 illustrates a user establishing operation according to the second exemplary embodiment of the present general inventive concept.

By referring to FIG. 12, a user may receive the status message delivered through printer driver 30 and display status informing without utilizing the determiner 15 of FIG. 10 (1201).

When utilizing the determiner 15 of FIG. 10, a user may set types of status messages to request detailed status message (1202). Setting values may be stored in the configuration 16 of FIG. 10.

Figure 13:
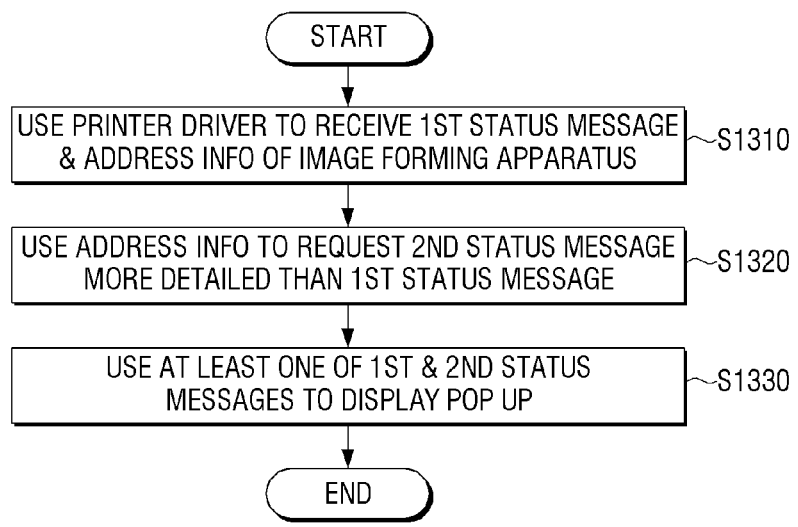
FIG. 13 is a flowchart illustrating a method of controlling a user terminal apparatus according to second exemplary embodiment of the present general inventive concept.

FIG. 13 is a flowchart illustrating a method of controlling the user terminal apparatus 100 according to the second exemplary embodiment of the present general inventive concept.

By referring to FIG. 13, the user terminal apparatus 100 uses a printer driver 30 of an image forming apparatus 200, and receives a first status message and address information of the image forming apparatus 200 at S1310.

The first status message is message predefined by the printer driver 30, and defined in the event XML 31 of the printer driver 30. It may be the status message as explained with reference to FIG. 9.

The user terminal apparatus 100 uses the received address information and requests a second status message more detailed than the first status message from the image forming apparatus 200 at S1320.

The second status message may be the detailed status message explained in FIG. 9.

Meanwhile, the second status message may include at least one attribute of warning, error, and info regarding status of the image forming apparatus 200. If status attributes extracted from the second status message are not a warning or an error, a second status message may be requested again after a delay of a predetermined time.

At S1330, the user terminal apparatus 100 utilizes at least one of the first and second status messages and displays the message in a pop-up format.

Meanwhile, the method of controlling a user terminal apparatus 100 of FIG. 13 may be implemented in the user terminal apparatus 100 having components as illustrated in FIG. 1, but is not limited thereto.

Figure 14:
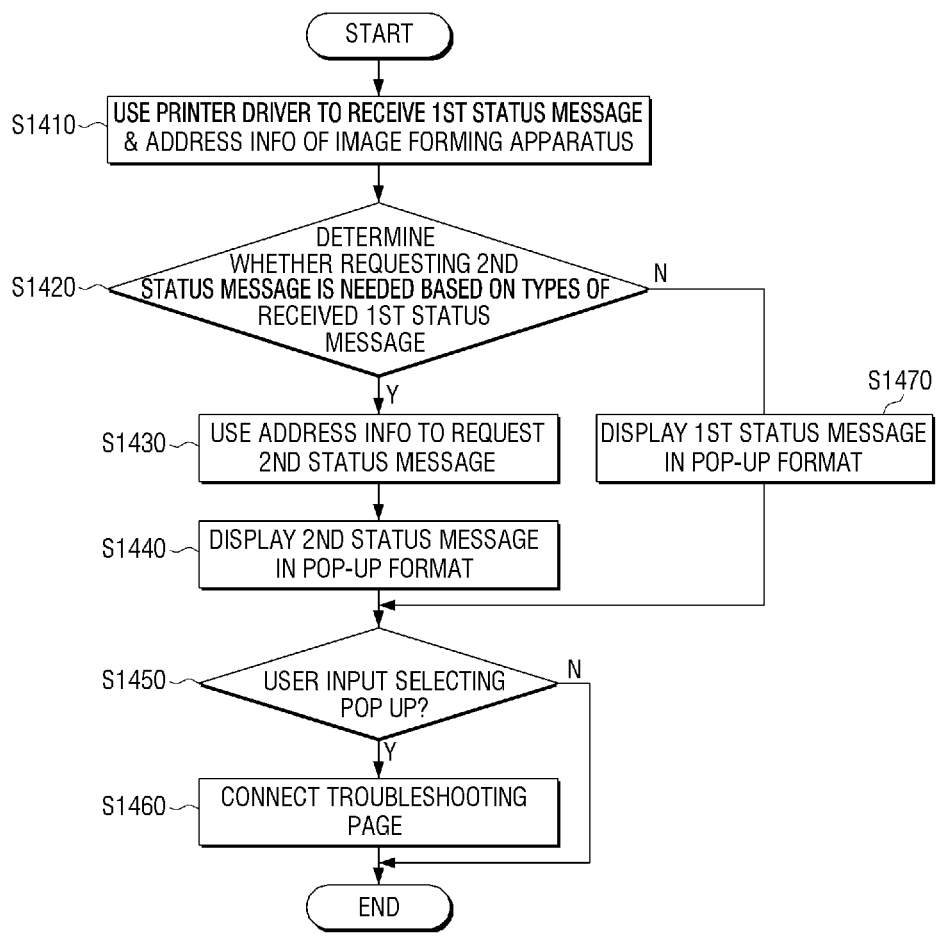
FIG. 14 is a flowchart illustrating a method of controlling a user terminal apparatus according to second exemplary embodiment of the present general inventive concept.

FIG. 14 is a flowchart illustrating a method of controlling the user terminal apparatus 100 according to the second exemplary embodiment of the present general inventive concept. FIG. 14 describes a control method of FIG. 13 together with determining a second status message and connecting a troubleshooting page.

By referring to FIG. 14, the user terminal apparatus 100 uses the printer driver 30 regarding an image forming apparatus 200 and receives a first status message and address information of the image forming apparatus 200 at S1410.

The first status message is message predefined by the printer driver 30, and is defined in the event XML 31 of the printer driver 30. It may be status message explained in FIG. 9.

At S1420, the user terminal apparatus 100 may determine whether requesting a second status message is needed based on types of the received first status message.

A determining process is explained in detail when describing the determiner 15 of FIG. 11, which will not be further described within an overlapping scope.

If it is determined that a second status message is needed at S1420 ("Yes"), a user may request a second status message by utilizing the received address information of an image forming apparatus 200 at S1430. A second status message may be displayed in a pop-up format at S1440.

Meanwhile, if it is determined that a second status message is not needed at S1420 ("No"), the user terminal apparatus 100 may display the received first status message in a pop-up format at S1470.

If a user inputs a selection of the pop-up message at S1450 ("Yes"), the user terminal apparatus 100 may connect a troubleshooting page at S1460, which displays a problem and information on how to solve the problem.

Meanwhile, the method of controlling a user terminal apparatus 100 in FIG. 14 may be implemented by the user terminal apparatus 100 having components as illustrated in FIG. 1, but is not limited thereto.

The above control method of the user terminal apparatus 100 according to the second exemplary embodiment of the present general inventive concept may receive detailed status message of an image forming apparatus 200 in an O/S having limitations in informing status of the image forming apparatus 200, and provide informing statuses regarding errors or warnings of the image forming apparatus 200 to a user.

Hereinafter, by referring to FIGS. 15 through 27, the user terminal apparatus 100 according to the third exemplary embodiment of the present general inventive concept will be explained.

Before explaining FIG. 15, a tile supported in a metro style UI environment of Windows 8™ is described below.

Figure 18:
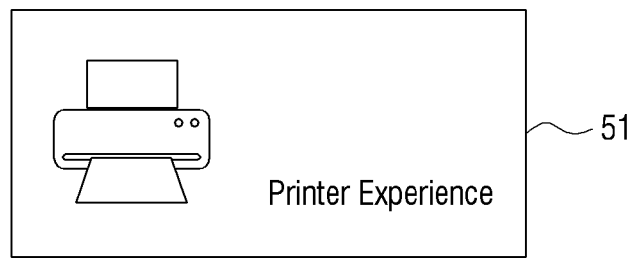
FIG. 18 is illustrates a main tile according to third exemplary embodiment of the present general inventive concept.

A tile is a rectangular or square-shaped icon used in a background screen (or start screen) in a metro style UI environment of Windows 8™, and has a linking function to allow a user to choose application, website, address book or other items. Unlike conventional icons, the tile may display changed information of each connected item in real time, and for example, may display the number of unread messages in a letter box in real time. The tile has two types, which is classified into application tile (main tile) and secondary tile. The application tile (main tile) is created when installing an application, and the secondary tile is additionally created by the user. FIG. 18 illustrates an example of the application tile (main tile), and describes a shape of a mail tile 51 of an application performing an image forming job.

Figure 19:
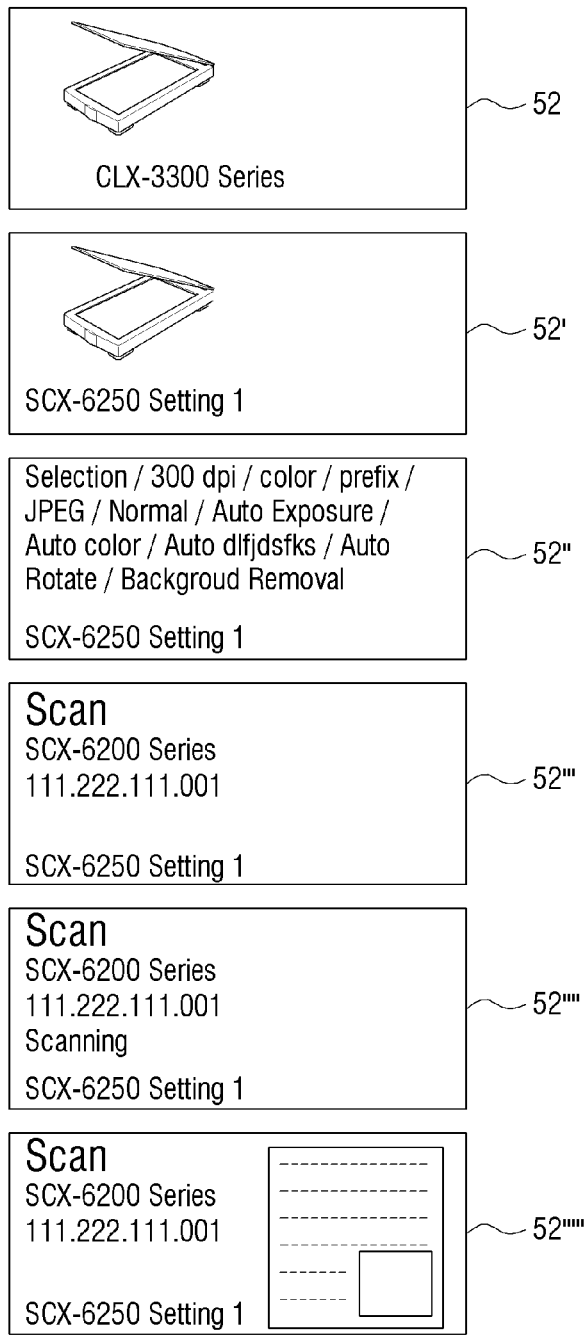
FIG. 19 is illustrates a secondary tile according to third exemplary embodiment of the present general inventive concept.

Meanwhile, FIG. 19 illustrates various examples of a secondary tile. The secondary tile may be designed as tile marking (image, model name) 52, tile marking (image, model name, setting number) 52', tile marking (model name, setting number, setting information) 52", tile marking (job type, model name, address information, setting number) 52''', tile marking (job type, model name, address information, job processing status, setting number) 52'''', and tile marking (job type, model name, address information, setting number, job performing results) 52'''''. Job processing status and job performing results may be showed and delivered by the secondary tile in real time.

Figure 16:
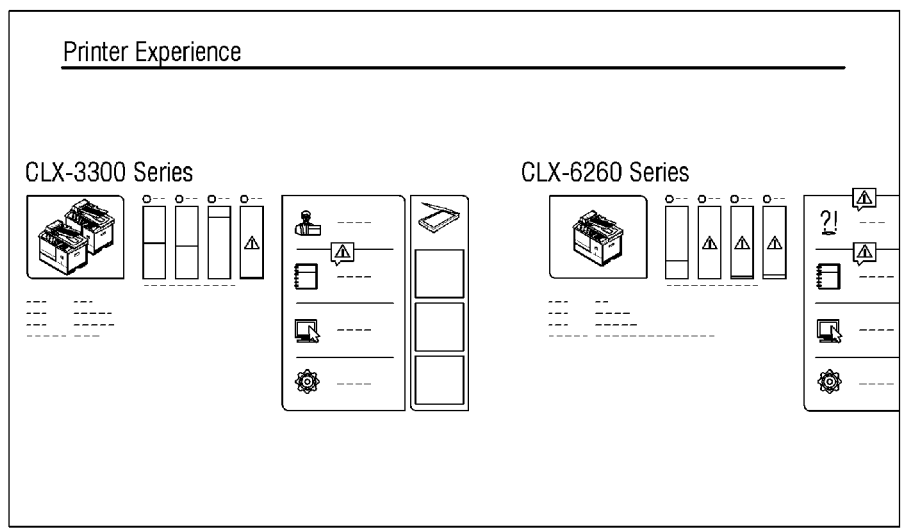
FIG. 16 is illustrates a main page according to third exemplary embodiment of the present general inventive concept.

Specifically, if an application tile (main tile) is selected by a user touch or mouse click, it may perform corresponding application. Implementing an application displays a main page of a corresponding application. FIG. 16 illustrates a main page according to an exemplary embodiment of the present general inventive concept, and describes main page displayed when performing scan application.

Figure 17:
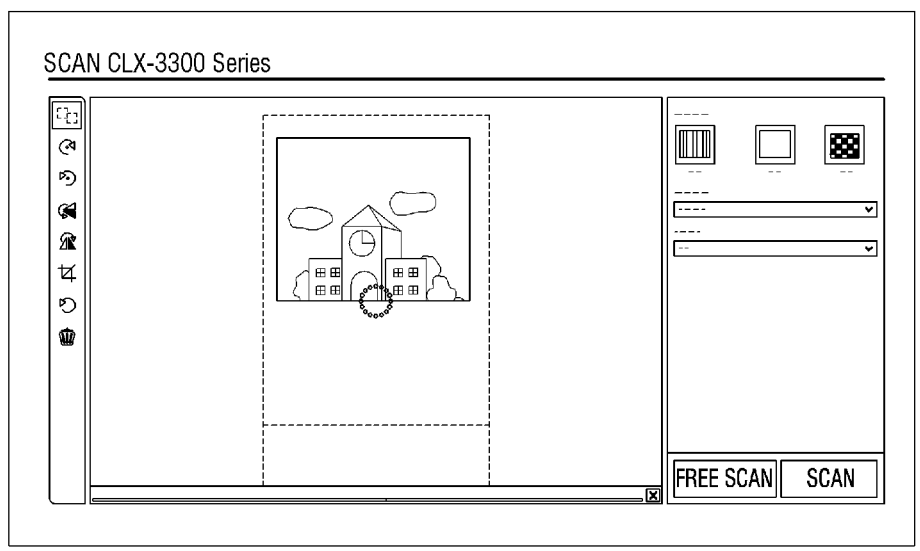
FIG. 17 is illustrates a job implementing page according to third exemplary embodiment of the present general inventive concept.

If the secondary tile is selected by the user touch or the mouse click, it may perform by showing a specific page of a corresponding application or it may route to a specific page number of an applications. In other words, the secondary tile displays a specific page of a corresponding application. FIG. 17 illustrates job performing page according to an exemplary embodiment of the present general inventive concept, and describes a scan job performing page of the image forming apparatus 200 selected in a scan application.

An application tile is defined as a main tile and an embodiment will be described by limitedly assuming that a job of an image forming apparatus 200 is a scan job.

Figure 15:
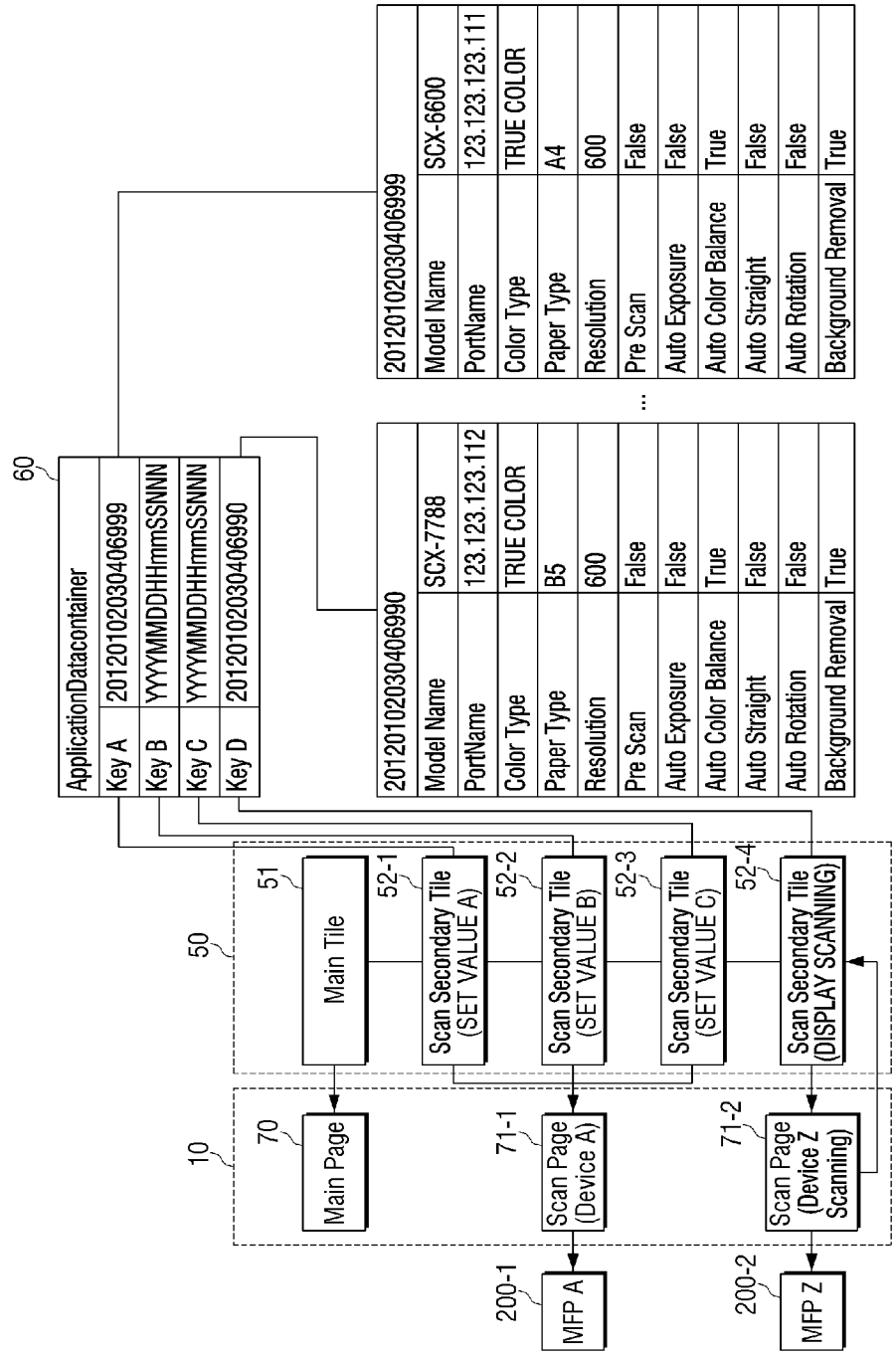
FIG. 15 is a brief block diagram of programs implemented on a user terminal apparatus according to third exemplary embodiment of the present general inventive concept.

FIG. 15 illustrates a relationship between an application and a tile according to the third exemplary embodiment of the present general inventive concept.

By referring to FIG. 15, a metro app 10 includes a main page 70 that is a basic application page, and a plurality of scan pages 71-1, 71-2 that are scan job performing pages, respectively. The plurality of scan pages 71-1, 71-2 may connect to an MFP A 200-1 device and an MFP Z (200-2) device, respectively.

Each page may connect to each tile of background screen (or start screen) 50. A main page 70 connects a main tile 51. The scan page (device A) 71-1 connects a plurality of scan secondary tiles 52-1, 52-2, 52-3, and the scan page (device Z) 71-2 connects scan secondary tile 51-4.

A plurality of scan secondary tiles 52-1, 52-2, 52-3 have different option values from each other, and connect one scan page 71-1.

Scan options and device information of an image forming apparatus 200 corresponding to scan secondary tiles 52-1, 52-2, 52-3, 52-4 respectively are stored in application data container 60. Specifically, each tile may set creating time (YYYYMMDDHHmmSSNNN) as ID and use the ID as a key to approach application data container 60.

Application data container 60 may map and store device information of an image forming apparatus and scan options with each tile ID in lookup-table format.

FIG. 20 is illustrates an operation of creating a secondary tile of the user terminal apparatus 100 according to the third exemplary embodiment of the present general inventive concept.

By referring to FIG. 20, if the application 10 is installed in a metro style UI environment of Windows 8™, the main tile 51 of the application may be displayed on the background screen (start screen). A user can click or touch main tile 51 and implement the application 10.

If application 10 implements, OnLaunched(LaunchActivatedEventArgs args) function of app class is called, args.Arguments is set as null value, and main page 70 of application may be displayed on screen.

By selecting any one of a plurality of connected image forming apparatuses 200, scan job performing page 71 of the selection of image forming apparatus 200 may be displayed on screen.

Figure 21:
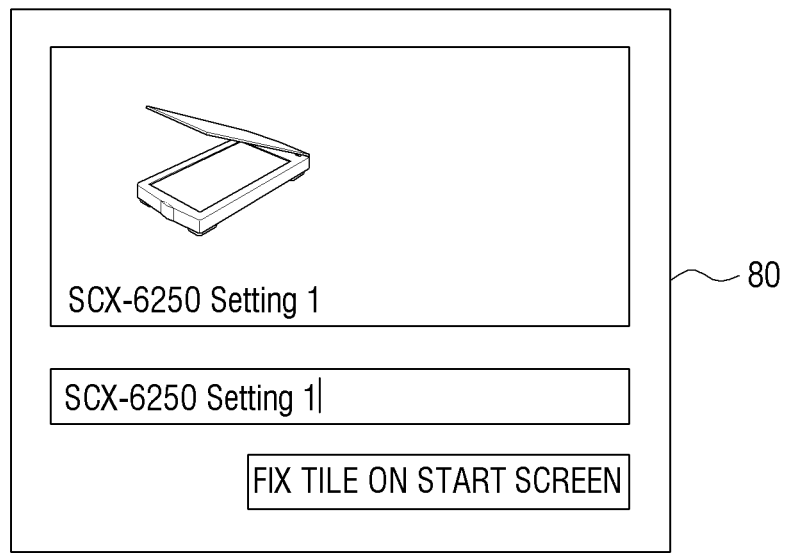
FIG. 21 illustrates an interface Windows to create a secondary tile of a user terminal apparatus according to third exemplary embodiment of the present general inventive concept.

Scan job options may be selected on the scan job performing page 71, and the secondary tile 52 may be created by using PinToStart of BottomAppbar. As such, creating time is set as tile ID so that tile information cannot be overwritten. Further, a tile name that a user wants may be set in "tile name input box" 80 provided by the O/S as illustrated in FIG. 21.

If creating secondary tile 52 completes, application data container 60 having tile ID as key value may be created and stored in data format like in Table 9 below.

TABLE 9

| Application Data Container (Key: 20120101060712232) | |
|---|---|
| Model Name | SCX-6200 Series |
| Port Name | |
| Color Type | TRUE COLOR |
| Paper Type | B5 |
| Resolution | |
| Pre Scan | True |
| Auto Exposure | True |
| Auto Color Balance | True |
| Auto Straight | |
| Auto Rotation | True |
| Background Removal | True |

An example of creating code regarding the above tile and application data container is described in Table 10 below.

TABLE 10 content.TileId = current time (example:20120101060712232)
content.ShortName = model name
content.DisplayName = model name
content.Arguments = "ScanPage"
content.WideLogoReference = logo image
  var secondaryTile =
    new Windows.UI.StartScreen.SecondaryTile(content.TileId,
        content.ShortName,
          content.DisplayName,
        content.Arguments,
        Windows.UI.StartScreen.TileOptions.ShowNameOnWideLogo,
        content.LogoReference,
        content.WideLogoReference);
ApplicationDataContainer container =
localSettings.CreateContainer(current time,
ApplicationDataCreateDisposition.Always);

Like a diagram described in FIG. 20 above, the user terminal apparatus 100 may perform an operation of creating a secondary tile.

Figure 22:
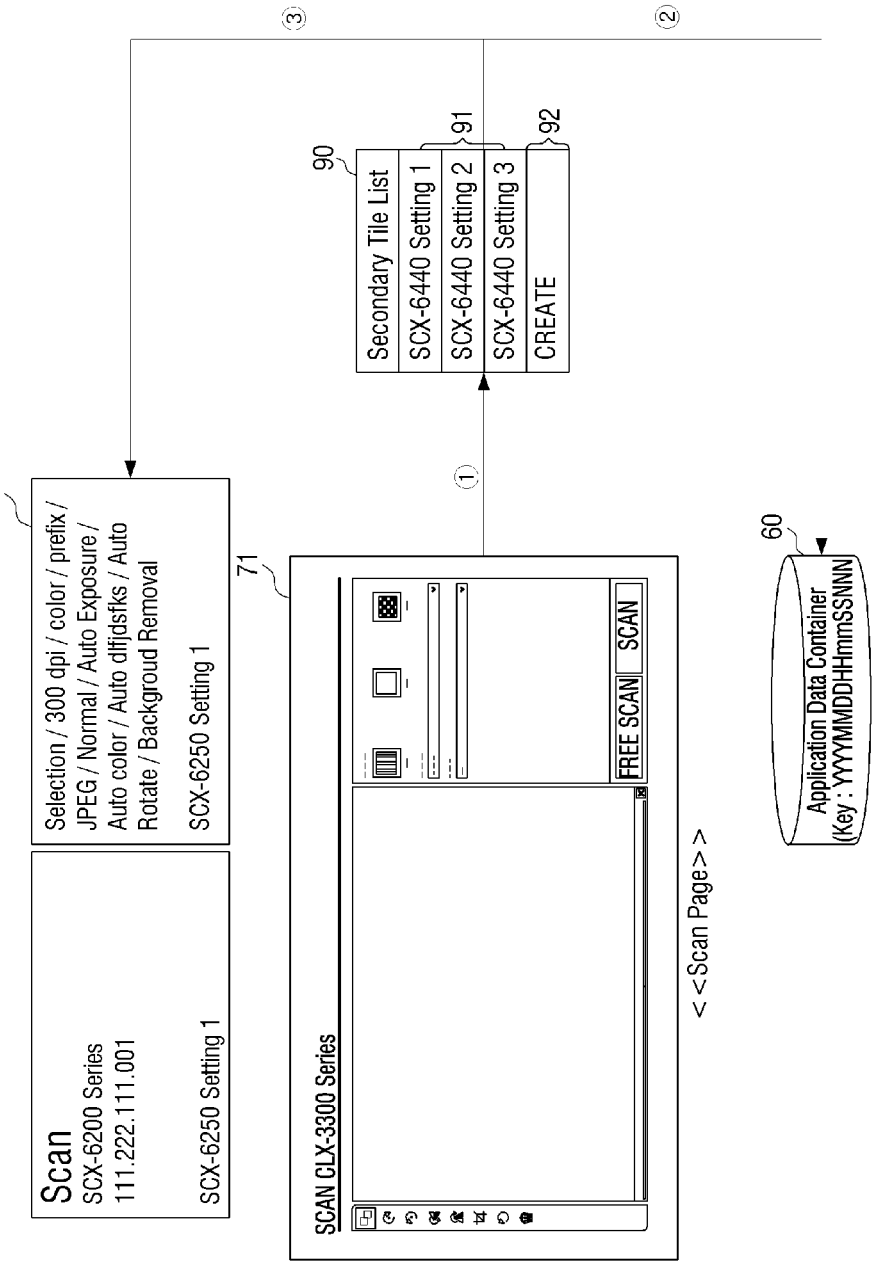
FIG. 22 is illustrates an operation of updating a secondary tile according to third exemplary embodiment of the present general inventive concept.

FIG. 22 is illustrates a operation of updating a secondary tile according to the third exemplary embodiment of the present general inventive concept.

By referring to FIG. 22, if at least one secondary tile is already created on the scan job performing page 71, a list 90 of the secondary tiles connected to an image forming apparatus 200 of the scan job performing page 71 may be displayed on screen.

A user can select a secondary tile to be updated 91, or create a new secondary tile 92.

If a user selects a secondary tile to be updated, he may update newly established scan options in application data container 60 by using the selected tile ID. In order to update scan options displayed by secondary tile 52 on the background screen, a tile notification included in scan options is transmitted to the tile. Only scan options may be updated by using tag of notification as "SettingInfo." Table 11 below is an example of including an update of a secondary tile.

TABLE 11

```
var tileUpdater =
TileUpdateManager.CreateTileUpdaterForSecondaryTile(TileID);
    TileNotification SettingInfoNotification = CreateSettingInfo( );
    SettingInfoNotification.Tag = "SettingInfo"
    tileUpdater.Update(SettingInfoNotification);
```

Similar to FIG. 22 above, the user terminal apparatus 100 may perform an operation of updating a secondary tile.

Figure 23:
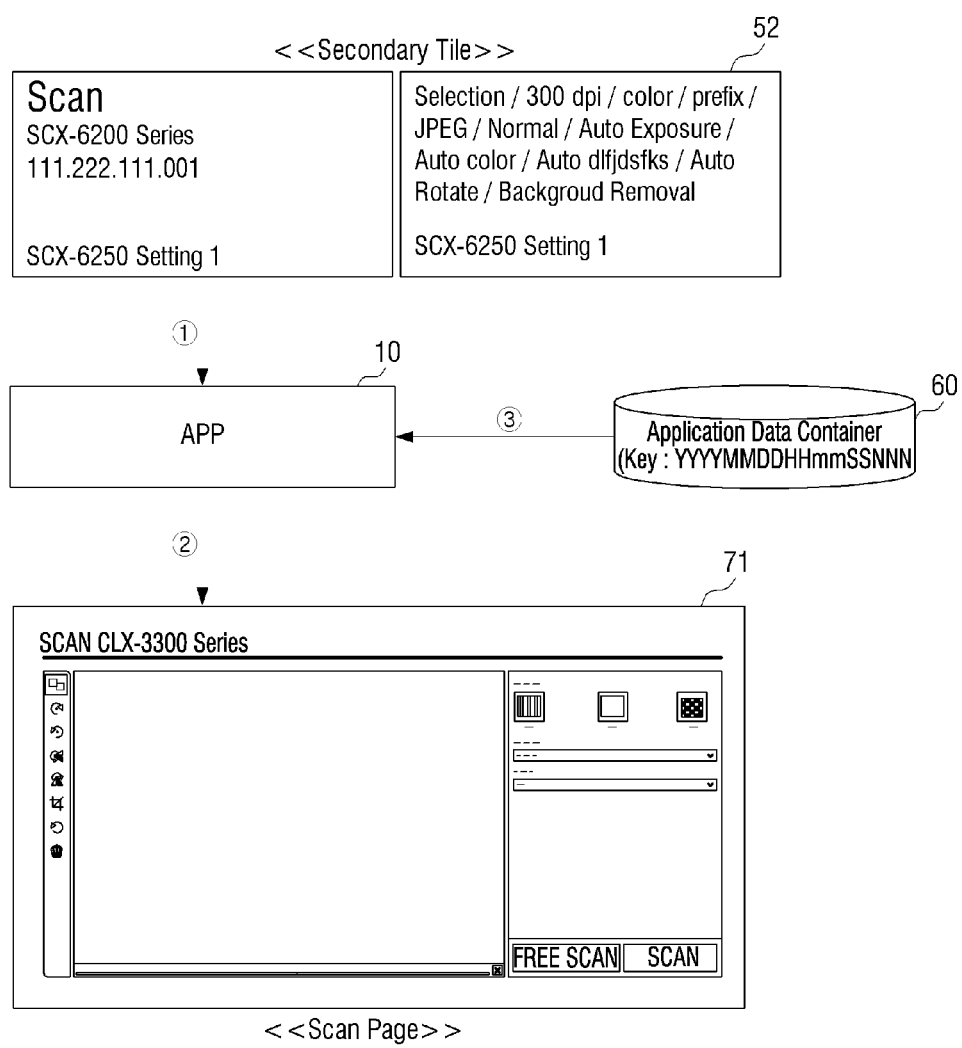
FIG. 23 is illustrates an operation of implementing a secondary tile according to third exemplary embodiment of the present general inventive concept.

FIG. 23 is illustrates an operation of performing a function via a secondary tile according to the third exemplary embodiment of the present general inventive concept.

By referring to FIG. 23, If a touch or a click to select a secondary tile 52 displayed on a background screen is input, a corresponding application 10 implements, OnLaunched (LaunchActivatedEventArgs args) function is called, args.Arguments is set as "ScanPage" value, and a scan job performing page 71 of the application may be displayed on screen.

By using a tile ID as key value, scan options stored in application data container may be read and automatically applied to scan job performing page 71. Table 12 below is an example of code loading scan options stored in application data container.

TABLE 12

```
ApplicationDataContainer container =
    ApplicationData.Current.LocalSettings.Containers[Tile ID];
DeviceModelName = container.Values["ModelName"];
DevicePortName = container.Values["PortName"];
ColorType = container.Values["ColorType"];
PaperType = container.Values["PaperType"];
Resolution = container.Values["Resolution"];
PreScan = container.Values["PreScan"];
AutoExposure = container.Values["AutoExposure"];
AutoColorBalance = container.Values["AutoColorBalance"];
AutoStraight = container.Values["AutoStraight"];
AutoRotation = container.Values["AutoRotation"];
BackgroundRemoval = container.Values["BackgroundRemoval"];
```

The user terminal apparatus 100 may perform an implementation of a secondary tile similarly as described with reference to FIG. 23 above.

Figure 24:
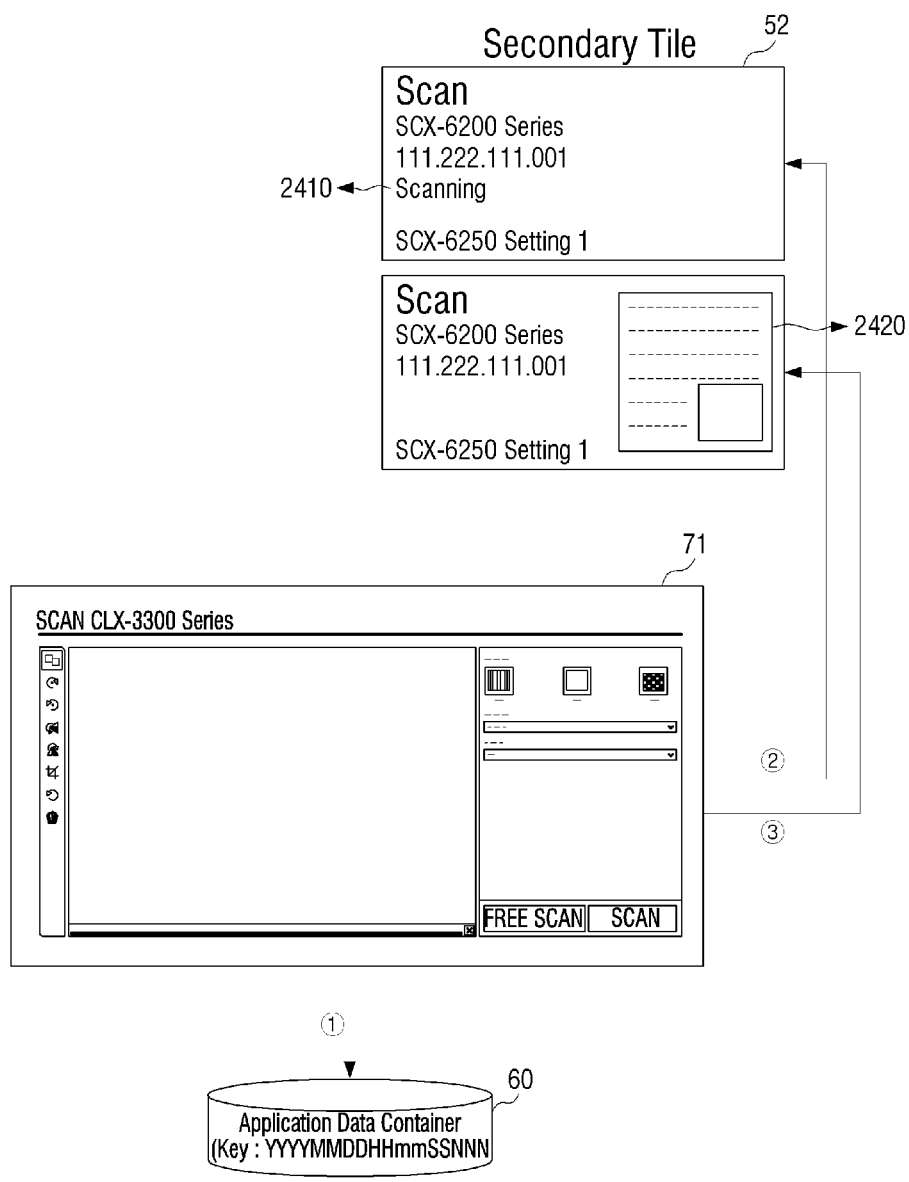
FIG. 24 is illustrates an operation of marking a job implementing status of an image forming apparatus on a secondary tile according to third exemplary embodiment of the present general inventive concept.

FIG. 24 is illustrates an operation of marking job performing status of an image forming apparatus 200 on a secondary tile according to the third exemplary embodiment of the present general inventive concept.

By referring to FIG. 24, if pushing a scan button on a scan job performing page 71, the secondary tile 52 mapped with the connected image forming apparatus 200 in an application data container is found.

If the scan job begins, tile notification may be transmitted and scan job performing status may be marked on secondary tile 52. Codes to transmit tile notification are illustrated in Table 13 below, and it may be updated in device information of an image forming apparatus 200, which is already displayed by using tag of secondary tile as "DeviceInfo."

TABLE 13

```
var tileUpdater =
TileUpdateManager.CreateTileUpdaterForSecondaryTile(TileID);
    TileNotification DeviceInfoNotification = CreateDeviceInfo( );
    TileNotification SettingInfoNotification = CreateSettingInfo( );
    DeviceInfoNotification.Tag = "DeviceInfo"
```

TABLE 13-continued

```
    SettingInfoNotification.Tag = "SettingInfo"
    tileUpdater.Update(DeviceInfoNotification);
    tileUpdater.Update(SettingInfoNotification);
```

As described above, if transmitting and updating notification reads that scan job is processing, secondary tile 52 may display "scanning" 2410. If transmitting and updating notification reads that scan job completes, secondary tile 52 may display scan image 2420.

Like a diagram of FIG. 24 above, the user terminal apparatus 100 may perform marking job performing status on a secondary tile.

Although the above exemplary embodiment of the present general inventive concept limitedly focuses on a scan job, a print job or a fax job may also be commonly applied.

Figure 25:
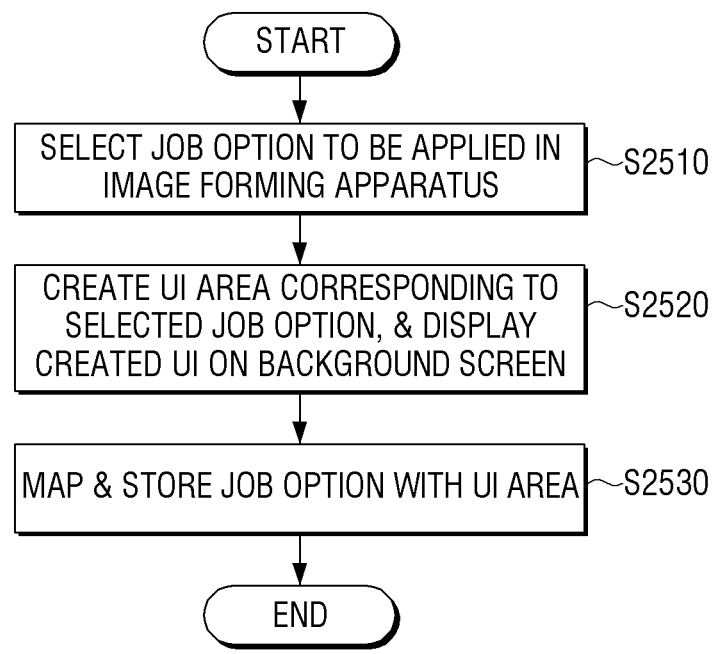
FIG. 25 is a flowchart illustrating a method of controlling a user terminal apparatus according to third exemplary embodiment of the present general inventive concept.

FIG. 25 is a flowchart provided to explain a method of controlling the user terminal apparatus according to the third exemplary embodiment of the present general inventive concept.

By referring to FIG. 25, the user terminal apparatus 100 receives selection of job options applied to an image forming apparatus 200 at S2510.

Meanwhile, before S2510, if predefined UI area is selected on background screen of an O/S, an application to perform jobs may be implemented. Predefined UI area may be a main tile of application.

Meanwhile, if job options are selected, they may be selected with an image forming apparatus 200 to perform jobs.

UI area corresponding to the selection of job options is created, and the created UI area is displayed on background screen at S2520. In this case, predefined UI area may be secondary tile of application.

At S2530, job options may be mapped and stored with the created UI area.

The created UI area may be secondary tile marking at least one of job options and device information of an image forming apparatus to perform jobs, and may be displayed in tile shape.

Meanwhile, the method of controlling a user terminal apparatus in FIG. 25 may be implemented by the user terminal apparatus 100 having components as illustrated in FIG. 1, but is not limited thereto.

Figure 26:
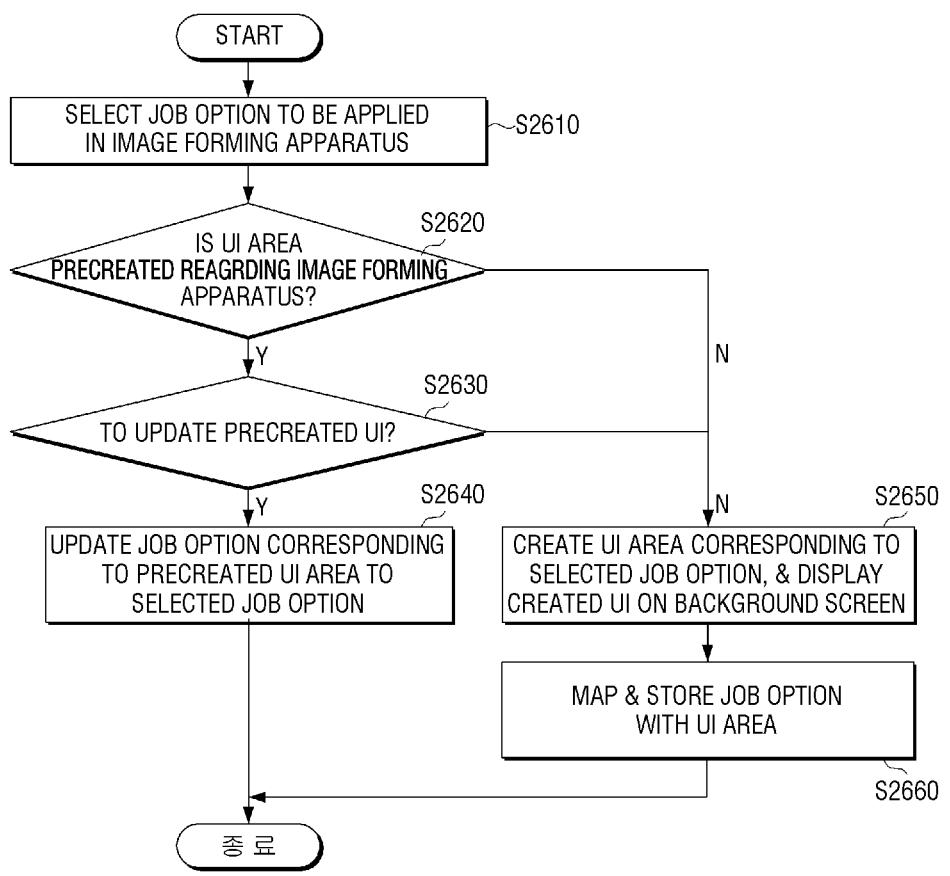
FIG. 26 is a flowchart illustrating a method of controlling a user terminal apparatus according to third exemplary embodiment of the present general inventive concept.

FIG. 26 is a flowchart provided to explain a method of controlling the user terminal apparatus according to the third exemplary embodiment of the present general inventive concept.

By referring to FIG. 26, the user terminal apparatus 100 receives a selection of job options applied to an image forming apparatus 200 at S2610.

Meanwhile, if job options are selected, they may be selected with an image forming apparatus 200 to perform jobs.

If previously created UI area is found regarding an image forming apparatus 200 at S2620 ("Yes"), a user manipulation may select whether job options corresponding to a previously created UI area is updated to job options selected by the user at S2630.

If a user selects update at S2630 ("Yes"), job options corresponding to previously created UI area may be updated to job options selected by the user at S2640.

Meanwhile, if a user does not select an update at S2630 ("No"), UI area corresponding to selection of job options may be newly created, and the created UI may be displayed on background screen at S2650. Job options may be mapped and stored in UI area at S2660.

The created UI area may be secondary tile marking at least one of job options and device information of an image forming apparatus to perform jobs, and may be displayed in a tile shape.

Meanwhile, if a previously created UI area is not found at S2620, S2650 and S2660 may be performed.

Meanwhile, the method of controlling a user terminal apparatus of FIG. 26 may be implemented by the user terminal apparatus 100 having components as illustrated in FIG. 1, but is not limited thereto.

Figure 27:
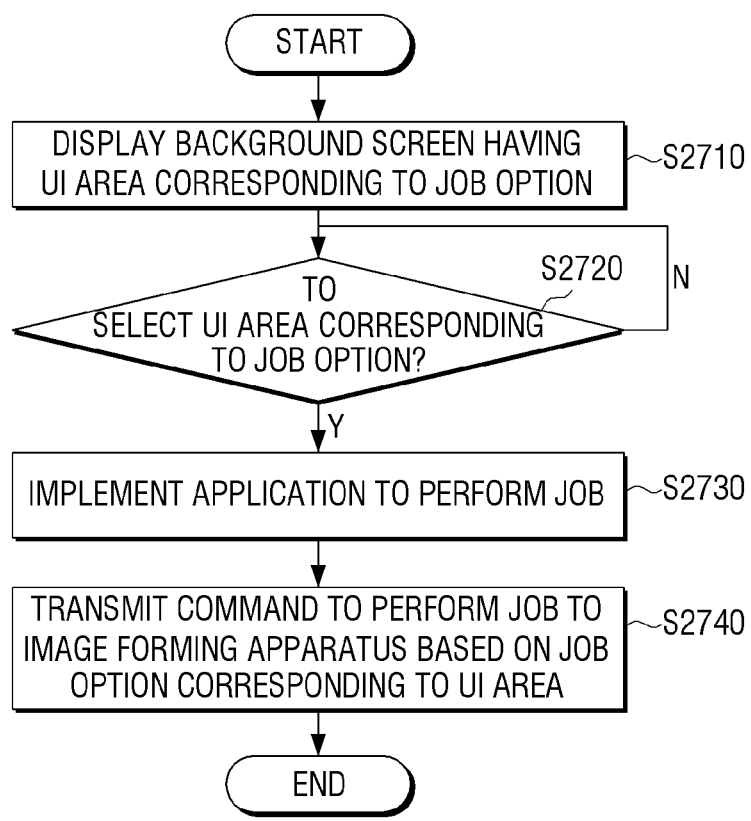
FIG. 27 is a flowchart illustrating a method of controlling a user terminal apparatus according to third exemplary embodiment of the present general inventive concept.

FIG. 27 is a flowchart provided illustrating method of controlling the user terminal apparatus 100 according to the third exemplary embodiment of the present general inventive concept.

By referring to FIG. 27, the user terminal apparatus 100 may display a background screen including UI area corresponding to job options at S2710. The UI area corresponding to the job options may be a secondary tile.

If a user selects UI area at S2720 ("Yes"), an image forming apparatus 200 and application to perform jobs may be performed at S2730.

Based on job options corresponding to UI area, a command to perform job may be transmitted to the image forming apparatus 200 at S2740.

A job performing page may be displayed, regarding an application for which job options corresponding to UI area are automatically applied. As such, if a user manipulation to modify job options is input on a job performing page, a command to perform the job may be transmitted to the image forming apparatus 200 based on the modified job options.

While performing jobs in the image forming apparatus 200 according to the command to perform job, the user terminal apparatus 100 may display the job performing information of the image forming apparatus 200 on the UI area.

Meanwhile, if the jobs complete in the image forming apparatus according to the command to perform the jobs, job performing results of the image forming apparatus 200 may be displayed on the UI area.

The method of controlling a user terminal apparatus in FIG. 27 may be implemented by the user terminal apparatus 100 having components as illustrated in FIG. 1, but is not limited thereto or other units.

The above method of controlling the user terminal apparatus 100 according to the third exemplary embodiment of the present general inventive concept may provide a UI area in which the image forming apparatus 200 to perform jobs and job options are automatically applied, and may perform jobs without redundant processes. Further, the user may intuitively view the job performing information in real time, since the job performing status is marked on the UI area.

A computer readable recording medium having programs to implement a control method of the user terminal apparatus according to a first embodiment that can connect to an image forming apparatus having a scan function and which is driven on an O/S of Windows 8™ include programs having a metro application displaying a user interface window receiving a command to perform a scan job and a V4 driver communicating with an image forming apparatus.

A metro application requests and receives address information of an image forming apparatus to a V4 driver, if a command to perform a scan job is input through a user interface window, transmits a command to perform a scan job to an image forming apparatus based on the received address information, and receives scan data from the image forming apparatus. A V4 driver provides address information of an image forming apparatus to metro application if a metro application requests address information of an image forming apparatus.

A metro application may communicate with the image forming apparatus by utilizing another network module different from a V4 driver.

Meanwhile, if command to perform a scan job is input, a metro application determines whether an image forming apparatus supports a V4 driver, displays the image forming apparatus supporting a V4 driver, and receives selection of an image forming apparatus to perform the command to perform a scan job.

A V4 driver may request and receive status information of an image forming apparatus as well as address information of an image forming apparatus.

A metro application may display a user interface window to receive a selection of scan options based on the received status information of an image forming apparatus, receive selection of scan options, and transmit selection of scan options with a command to perform a scan job to an image forming apparatus.

Status information may include at least one of network information, supportable job information, and component consumption information regarding an image forming apparatus.

Meanwhile, a V4 driver may be a printer driver supporting predefined Bidi communication schema.

The computer readable recording medium having programs to implement a control method of the user terminal apparatus according to a first exemplary embodiment of the present general inventive concept that can connect to an image forming apparatus and which is driven on an O/S of Windows 8™ obtain address information of the image forming apparatus 200 in an O/S that does not directly provide address information of a connected image forming apparatus, and provide a metro application to perform a scan job by using the address information.

Computer readable recording medium having programs to implement the user terminal apparatus according to a second exemplary embodiment of the present general inventive concept that can connect to an image forming apparatus having a scan function and which is driven on an O/S of Windows 8™ include programs having a metro application to provide a user interface window having status information of an image forming apparatus and a V4 driver to communicate with the image forming apparatus.

A V4 driver receives a first status message and address information of an image forming apparatus. A metro application requests a second status message that is more detailed than a first status message to an image forming apparatus by utilizing the received address information through a V4 driver and displays at least one of first and second status messages on a user interface window.

A metro application may determine whether requesting a second status message is needed based on types of the received first status message.

A metro application may request a second status message only if determining that a second status message is needed.

Meanwhile, if a user sets types of a first status message to request a second status message, a metro application may determine whether requesting a second status message is needed based on types of a first status message established by the user.

If user manipulation to select user interface Windows displaying status message is input, a metro application may connect to a troubleshooting page by using at least one of first and second status messages.

Meanwhile, a first status message may be message predefined in a V4 driver, or defined in an event XML of a V4 driver.

A second status message may include at least one attribute of a warning, an error and information regarding a status of an image forming apparatus.

If status attributes extracted from a second status message are not a warning or an error, a metro application may request a second status message again after a delay of a predetermined time.

The computer readable recording medium having programs to implement the user terminal apparatus according to a second exemplary embodiment that can connect to an image forming apparatus and which is driven on an O/S of Windows 8™, receives detailed status message of an image forming apparatus in an O/S having limitations in status informing of an image forming apparatus, and provides a user with a metro application to provide status information regarding an error or a warning of an image forming apparatus.

In a computer readable recording medium having metro application to implement a control method of the user terminal apparatus according to a third exemplary embodiment of the present general inventive concept that can connect to an image forming apparatus and that which is driven on an O/S of Windows 8™, the metro application is driven if a UI area corresponding to job options is selected on a background screen of Windows 8™ and transmits command to perform a job to an image forming apparatus based on job options corresponding to UI area.

The metro application may be driven if the UI area corresponding to the job options is selected on a background screen of Windows 8™, display job performing page in which job options corresponding to UI area are automatically applied, and transmit command to perform job to the image forming apparatus based on modified job options if user manipulation to modify the job options is input on a job performing page.

While performing jobs in an image forming apparatus according to a command to perform a job, a metro application may display job performing information of the image forming apparatus on UI area.

If jobs are completed in an image forming apparatus according to a command to perform the jobs, a metro application may display job performing results of the image forming apparatus on UI area.

Further, in the computer readable recording medium having a metro application to implement a control method of the user terminal apparatus according to a third embodiment that can connect to an image forming apparatus and which is driven on an O/S of Windows 8™, the metro application may display user interface a window to receive a selection of job options that may be applied to an image forming apparatus, create a UI area corresponding to selection of job options, display the created UI area on background screen of Windows 8™, map job options with the UI area, and store the mapped information.

If a previously created UI area is found regarding an image forming apparatus, a metro application may update job options corresponding to the previously created UI area to a selection of job options, and may display and store the updated job options according to a user manipulation.

Meanwhile, a metro application may receive a selection of an image forming apparatus to perform jobs as well as job options.

The created UI area may be a tile shape icon marking at least one of job options and device information of the image forming apparatus to perform jobs.

The computer readable recording medium having a metro application to implement a control method of the user terminal apparatus according to a third embodiment that can connect to an image forming apparatus and that is driven by an O/S of Windows 8™ provides a metro application to provide a UI area to which an image forming apparatus to perform jobs and job options is automatically applied, to perform jobs without redundant processes, to display job performing status on UI area, and thus, to intuitionally show job performing information to a user in real time.

The present general inventive concept can also be embodied as computer-readable codes on a computer-readable medium. The computer-readable medium can include a computer-readable recording medium and a computer-readable transmission medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A non-transitory computer readable recording medium having embodied thereon a computer program to execute a method of controlling a user terminal apparatus to connect to an image forming apparatus and which is driven by an operating system (O/S) of WINDOWS, wherein the program comprises:

a metro application to provide a user interface window including status information of the image forming apparatus; and a V4 driver to communicate with the image forming apparatus, wherein the V4 driver receives a first status message and address information of the image forming apparatus, and the metro application utilizes the address information received via the V4 driver, requests a second status message that is more detailed than the first status message from the image forming apparatus and that is related to the status information of the image forming apparatus, and displays at least one of the first status message and the second status message on the user interface window, wherein the first status message is predefined in the V4 driver, and the second status message is not predefined in the V4 driver.

2. The non-transitory computer readable recording medium of claim 1, wherein the metro application determines whether requesting the second status message is needed based on types of the received first status message.

3. The non-transitory computer readable recording medium of claim 2, wherein the metro application requests the second status message only if determining that the second status message is needed.

4. The non-transitory computer readable recording medium of claim 2, wherein, if a user sets types of the first status message that necessitate request of the second status message, the metro application determines whether requesting the second status message is needed or not based on the types of the first status message set by the user.

5. The non-transitory computer readable recording medium of claim 1, wherein the metro application utilizes at least one of the first status message and the second status message to connect to a troubleshooting page, if a user manipulation to select user interface window displaying the status message is input.

6. The non-transitory computer readable recording medium of claim 1, wherein the first status message is defined in event XML of the V4 driver.

7. The non-transitory computer readable recording medium of claim 1, wherein the second status message comprises at least one attribute from among warning, error and info regarding status of the image forming apparatus.

8. The non-transitory computer readable recording medium of claim 7, wherein the metro application requests a second status message again after a delay of a predetermined time, if status attributes extracted from the second status message are not warning or error.

9. A control method of a user terminal apparatus connected to an image forming apparatus and which is driven on an operating system (O/S) of WINDOWS, the control method comprising:
receiving a first status message relating to a status of the image forming apparatus and address information of the image forming apparatus by using V4 driver communicating with the image forming apparatus;
requesting a second status message that is more detailed than the first status message from the image forming apparatus and that is related to the status of the image forming apparatus by using a metro application previously stored in the user terminal apparatus and the received address information without using the V4 driver; and
displaying at least one of the first status message and the second status message on a user interface window provided by the metro application,
wherein the first status message is predefined in the V4 driver, and the second status message is not predefined in the V4 driver.

10. The control method of claim 9, further comprising:
determining whether requesting the second status message is needed based on types of the received first status message.

11. The control method of claim 10, wherein the requesting the second status message is performed only if determining that the second status message is needed.

12. The control method of claim 10, the determining comprising:
setting, by the user, types of the first status message which necessitate request of the second status message; and
determining whether requesting the second status message is needed based on the types of the first status message set by the user.

13. The control method of claim 9, further comprising:
connecting to a troubleshooting page by using at least one of the first status message and the second status message, if user manipulation to select user interface window to display the status message is input.

14. The control method of claim 9, wherein the second status message comprises at least one attribute from among warning, error and info regarding status of the image forming apparatus.

15. The control method of claim 14, wherein, if status attributes extracted from the second status message are not warning or error, a second status message is requested again after a delay of a predetermined time.

16. A user terminal apparatus which can connect to an image forming apparatus and which is driven on an operating system (O/S) of WINDOWS, comprising:
a storage to store a metro application to provide a user interface window including status information of the image forming apparatus and a V4 driver communicating with the image forming apparatus;
a communicating interface to receive a first status message relating to the status of the image forming apparatus and address information of the image forming apparatus by using the V4 driver;
a controller to control the communicating interface to request a second status message that is related to the status of the image forming apparatus and that is more detailed than a first status message from the image forming apparatus by using the metro application and the address information; and
a display to display at least one of the first status message and the second status message on a user interface window provided by the metro application,
wherein the first status message is predefined in the V4 driver, and the second status message is not predefined in the V4 driver.

17. A method of controlling a user terminal apparatus, comprising:
receiving a first status message relating to the status of an image forming apparatus and address information of the image forming apparatus using a printer driver;
determining whether requesting a second status message that is related to the status of an image forming apparatus, that is more detailed than the first status message from the image forming apparatus, and that is required based on a type of the received first status message;
displaying at least one of the first and second status messages in a pop-up format based on the determination and a metro application; and
connecting a troubleshooting page by using at least one of the first and second status messages based on a user's selection thereof,
wherein the first status message is predefined in the V4 driver, and the second status message is not predefined in the V4 driver.

18. The method of claim 17, further comprising:
requesting the second status message if it is determined that the second status message is required.

19. The method of claim 17, wherein only the first status message is displayed in a pop-up format if it is determined that the second status message is not required.

20. The method of claim 17, wherein the first status message is a message predefined by the printer driver, and defined in an event XML of the printer driver.

21. The method of claim 17, further comprising managing the image forming apparatus installed in the UTA and controlling transmission of image forming jobs of the image forming apparatus using a printer spooler.

22. The method of claim 21, wherein at least one of the printer driver and the printer spooler provides a status informing event to a metro application based on at least one of the first and second status message received from an image forming apparatus by being connected to an event XML of the printer driver.

* * * * *